3,584,074
FIBROUS MATERIALS FROM POLYETHYLENE TEREPHTHALATE POLYETHER COPOLYMER AND POLYAMIDE
Takeo Shima, Shoji Kawase, and Masataka Oshima, Yamaguchi-ken, and Shiro Shimauchi, Norihiro Minemura, and Takeshi Matsui, Osaka-fu, Japan, assignors to Teijin Limited, Osaka, Japan
Filed Nov. 1, 1968, Ser. No. 772,508
Int. Cl. C08g 41/04
U.S. Cl. 260—857
5 Claims

ABSTRACT OF THE DISCLOSURE

A fibrous material having improved dyeability and good anti-pilling properties comprising (a) 90 to 70 parts by weight of a modified polyethylene terephthalate copolymerized with 2 to 7% by weight of a polyoxyethylene group of an average molecular weight of 600 to 6,000 and (b) 10 to 30 parts by weight of a linear polyamide containing 5 to 60 mol percent of an aromatic radical, based on the amide bond. Such fibrous material is characterized in that the ratio of the reduced viscosity of the modified polyethylene terephthalate to the reduced viscosity of the linear polyamide is 0.8–4.0:1 and that each of the components constitutes a separate phase in the blend.

---

This invention relates to new fibrous materials made of polyester-polyamide blend polymer. More particularly, the inventon relates to fibrous materials made essentially of a blended composition of (a) a polyester whose principal constituent unit is ethylene terephthalate copolymerized with a polyoxyethylene group (hereinafter to be referred to as modified polyester) and (b) a linear polyamide containing 5–60 mol percent of an aromatic radical based on the amide bond, which fibrous materials are not only readily dyeable but possess good anti-pilling property. The polyethylene terephthalate fiber made by spinning and drawing polyethylene terephthalate which is obtained by reacting terephthalic acid or its lower aliphatic esters with ethylene glycol has, for example, a high degree of crystallinity and a high softening point and also possesses excellent properties with respect to such as its chemical resistance, heat resistance, light resistance, tenacity and Young's modulus, with the consequence that it has found wide use as a fiber for clothing use as well as for industrial uses. On the other hand, the polyethylene terephthalate fiber possesses, aside from the aforementioned merits, such drawbacks as poor dyeability and a proveness to pilling. Hence, despite the aforementioned excellent properties, the range of its utility has as a matter of course been restricted.

For improving on such drawbacks of the polyethylene terephthalate fiber as hereinabove described, it is known in manufacturing polyethylene terephthalate to substitute for a part of the foregoing terephthalic acid or its lower aliphatic esters and/or ethylene glycol, other dicarboxylic acids, hydroxycarboxylic acids and/or other dihydric alcohols to thereby produce a copolymeric polyester containing above 85 mol percent of the ethylene terephthalate units and thereafter spinning and drawing this polyester into a fiber.

The dicarboxylic acids used in this case include the aliphatic dicarboxylic acids such, for example, as succinic, adipic and sebacic acids, the aromatic dicarboxylic acids such, for example, as isophthalic acid, diphenyldicarboxylic acid, naphthalene-dicarboxylic acid, diphenylether-dicarboxylic acid, diphenylsulfone-dicarboxylic acid, diphenylmethane-dicarboxylic acid and diphenoxyethane-dicarboxylic acid.

On the other hand, as the hydroxycarboxylic acids were used the aliphatic hydroxycarboxylic acids such, for example, as alpha-hydroxyacetic acid, and epsilon-hydroxycapronic acid, and the aromatic hydroxycarboxylic acids such, for example, as p-hydroxybenzoic acid, m-hydroxybenzoic acid and vanillic acid.

The dihydric alcohol used for modification included the aliphatic glycols such, for example, as trimethylene glycol, propylene glycol, butylene glyclo, diethylene glycol, triethylene glycol and a polyoxyalkylene glycol of a molecular weight less than about 6000, and the alicyclic glycols such, for example, as cyclohexanediol and 1,4-dihydroxymethyl cyclohexane.

However, while the anti-pilling property of the fiber made of polyethylene terephthalate which has been modified by means of dicarboxylic acids, hydroxycarboxylic acids and/or dihydric alcohols, as hereinabove described, is improved over that of the polyethylene terephthalate fiber, and its dyeability by means of the disperse dyestuffs is also enhanced, the improvements had are not completely satisfactory as yet.

Although the anti-pilling property and the dyeability of such a modified polyethylene terephthalate can be improved still further by increasing the amount of the aforesaid copolymeric component, on the other hand, if the proportion of this copolymeric component is increased to above 15 mol percent, the physical properties of the resulting modified polyethylene terephthalate, for example, its heat resistance, solvent resistance, chemical resistance, tenacity and Young's modulus decline excessively and the fiber becomes such that it is not of practical use. On the other hand, when the aforesaid polyoxyalkylene glycol is used as the modifier, the dyeability and anti-pilling property of the resulting modified polyester are enhanced with the addition of a relative low mol percent of the foregoing modifier, but since the heat resistance, light resistance and weatherability suffer, it is impossible in practice to carry out the modification with more than 10% by weight of the polyoxyalkylene glycol as a whole.

An object of the persent invention is to provide fibrous materials of the polyester type having physical properties, e.g. tenacity and Young's modulus, of such a degree that they can be used for the usual clothing and industrial purposes as well as whose affinity for disperse dyes is great. Another object is to provide fibrous materials of the polyester type having not only great affinity for the disperse dyes but whose affinity for, e.g., acid dyes is also great, and furthermore which can be dyed by using even the basic dyes. A further object is to provide fibrous materials of the polyester type which excel in anti-pilling property.

Other objects and advantages of the invention will become apparent from the following description.

The foregoing objects and advantages are attained by fibrous materials, in accordance with the present invention, which is characterized in that they consist essentially of (a) 90–70 parts by weight of a modified polyethylene terephthalate which has been copolymerized with 2–7% by weight, based on the overall weight, of a polyoxyethylene group of an average molecular weight of 600–6000, and (b) 10–30 parts by weight of a linear polyamide containing 5–60 mol percent of an aromatic radical, based on the amide bond; and that they are fibers (c) wherein the ratio of the reduced viscosity of the aforesaid modified polyester to the reduced viscosity of the aforesaid linear polyamide is 0.8–4:1, and (d) wherein the aforesaid modified polyester and polyamide constitute a blend in which each of the aforesaid components make up a separate phase; and furthermore (e) that they are fibers wherein the birefringence Δn, as defined in the specification, is 0.110–0.160.

The present invention will be described more fully hereinafter.

The term "fibrous materials," as used herein, comprehends all of such fibers as monofilament, multi-filaments and staple fibers. It goes without saying that the foregoing multifilaments comprehend all those in an assembled state such as yarn, tow and the like, while the staple fibers may be those in any of the aggregate states such as in the form of cotton, felt, sliver and the like.

The fibers which make up the fibrous materials of the present invention consist essentially of the following two polymers, namely:

(a) as one of the polymers, a modified polyethylene terephthalate which has been copolymerized with 2–7% by weight, and preferably 3–6% by weight, based on the overall weight, of a polyoxyethylene group of an average molecular weight of 600–6000, and (b) a linear polyamide containing 5–60 mol percent, and preferably 10–50 mol percent of an aromatic radical, based on the amide bond.

(a) Modified polyester

The modified polyester of (a), above, can be prepared, for example, by a method such as described below.

Terephthalic acid or its lower aliphatic ester of 1–4 carbon atoms is heated with ethylene glycol in the presence of a known esterification catalyst or ester-exchange catalyst to form a diethylene glycol ester of terephthalic acid or its oligomer (first step). Next, a prescribed amount of a mono- or difunctional polyoxyethylene compound is added to the diethylene glycol ester or its oligomer and the mixture is heated under reduced pressure in the presence of a known polycondensation catalyst (second step).

That is to say, the modified polyester of (a), above, which is used in the present invention, is produced by adding a prescribed amount of a mono- or difunctional polyoxyethylene compound in the second step, i.e. in the step where the polycondensation reaction of polyethylene terephthalate is carried out in a manner known per se. Hence, the particulars as to the temperature conditions, catalyst used, etc., may be in accordance with any of those conditions which are employed during the preparation of polyethylene terephthalate, as disclosed, for example, in U.S. Pats. 2,465,319 and 2,578,660, etc.

As the aforesaid mono- or difunctional polyoxyethylene compound to be used in the preparation of the modified polyesters of this invention, any may be used provided it is one in which the polyoxyethylene group

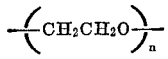

contained is of a molecular weight 600–6000, and preferably 1000–5000, as well as in which at least one of its two terminal groups is a reactive group which can form an ester bond in the polyester forming reaction, e.g., a hydroxy group (—OH) or its carboxylic acid ester [—OCOR where R is a hydrocarbon group] or its carbonic acid ester [—OCOOR where R is as above defined] and further a carboxyl group (—COOH) or its ester [—COOR (where R is as above defined)].

As such as polyoxyalkylene compound, mention can be made of such as the following:

(1) monohydroxy-polyoxyethylene compounds

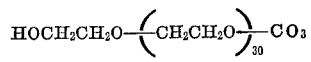

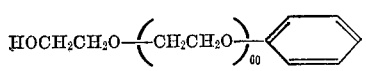

(2) monoacyloxy-polyoxyethylene compounds

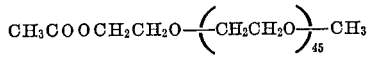

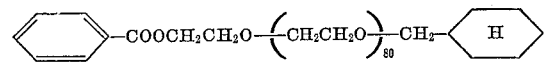

(3) polyoxyethylene monocarbonate

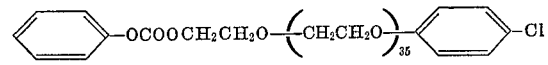

(4) monocarboxy-polyoxylene compounds

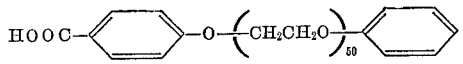

(5) monoalkoxycarbonyl-polyoxyethylene compound

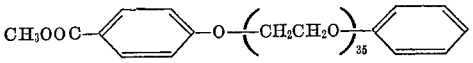

(6) monoaryloxycarbonyl-polyoxyethylene compound

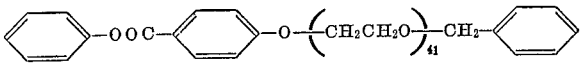

(7) dihydroxy-polyoxyethylene compounds

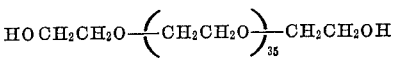

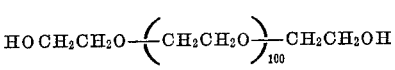

(8) diacyloxy-polyoxyethylene compound

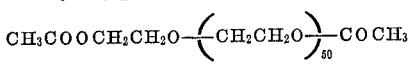

(9) polyoxyethylene dicarbonate

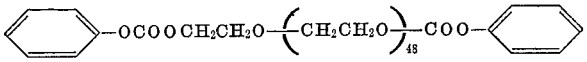

(10) dicarboxy-polyoxyethylene compound

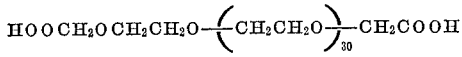

(11) dialkoxycarbonyl-polyoxyethylene compound

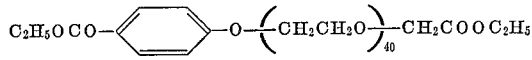

(12) diaryloxycarbonyl-polyoxyethylene compound

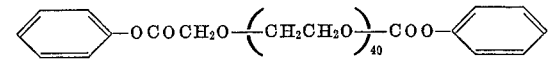

(13) hydroxy-carboxy-polyoxyethylene compound

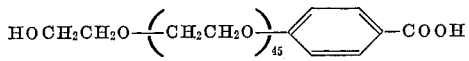

(14) acyloxy-carbonyl-polyoxyethylene compound

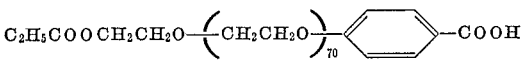

(15) hydroxy-alkoxycarbonyl-polyoxyethylene compound

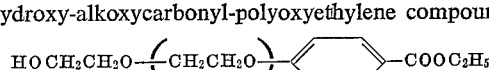

(16) carbonate of hydroxyalkoxycarbonyl-polyoxyethylene compound

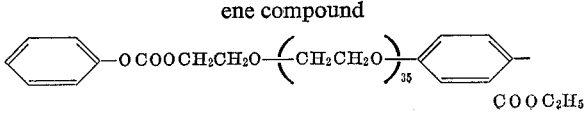

Further, the nitrogen-containing polyoxyalkylene derivatives are also used as the dihydroxy-polyoxyethylene compounds. As examples, included, for instance, are such as

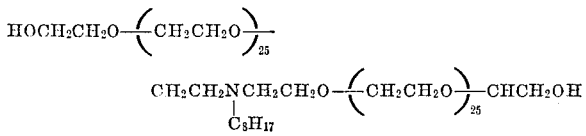

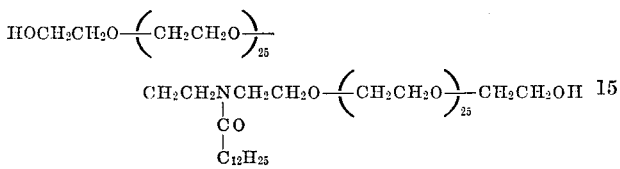

and

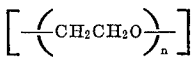

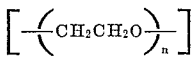

In preparing the modified polyester to be used in the present invention, this is conveniently carried out by adding the hereinbefore indicated mono- or difunctional polyoxyethylene compound during the previously described second step of the polyethylene terephthalate preparation reaction, in an amount such that the polyoxyethylene group $$\left[-\left(CH_2CH_2O\right)_n-\right]$$

of an average molecular weight of 600–6000, and preferably 1000–5000, contained in the aforesaid polyoxyethylene compound is copolymerized with the polyethylene terephthalate in an amount of 2–7% by weight, and preferably 3–6% by weight, based on the overall weight of the resulting modified polyester. Now, when the polyoxyethylene compound used is a monofunctional compound such as indicated in (1–6), above, its polyoxyethylene group $$\left[-\left(CH_2CH_2O\right)_n-\right]$$

attaches to the end of the polyethylene terephthalate molecule. On the other hand, when the polyoxyethylene compound is a difunctional compound such as indicated in (7–16), above, the aforesaid polyoxyethylene group is copolymerized in random to an optional position in the main chains of the polyethylene terephthalate.

In the present invention, provided that the polyethylene terephthalate is one in which the polyoxyethylene group

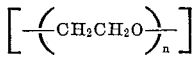

(wherein $n$ represents degree of polymerization) of an average molecular weight of 600–6000, and preferably 1000–5000, is copolymerized, as hereinbefore indicated, in an amount of 2–7% by weight, and preferably 3–6% by weight, to the main chain of the polyethylene terephthalate based on its overall weight, it may be one in which the polyoxyethylene group is attached to its end or one in which said group is attached to any position in the main chain. Further, when the attachment is to the end, the non-reactive terminal group of said monofunctional polyoxyethylene compound may be any hydrocarbon residue. Again, this hydrocarbon residue may have any substituent, say, such as a chlorine, fluorine or bromine atom.

The reason why a polyethylene terephthalate which has been copolymerized with a polyoxyethylene group of a molecular weight of 600–6000, and preferably 1000–5000, is used in the present invention as described above is because when the molecular weight of the polyoxyethylene group is below 1000, and particularly below 600, not only is there no improvement to a satisfactory extent in the dyeability of the invention fibers but also a great decline in melting point of said fibers take place. On the other hand, when the molecular weight exceeds 5000, and particularly 6000, it is not desirable since not only the improvement in the dyeability is small but also because the fibers become susceptible to air oxidation when hot. Further, the copolymerization reaction itself also becomes difficult of carrying out when a polyoxyethylene group of a molecular weight exceeding 6000 is to be copolymerized to a polyethylene terephthalate molecule.

On the other hand, the reason why the content of said polyoxyethylene group has been specified as 2–7% by weight, and preferably 3–6% by weight, of the modified polyethylene terephthalate is because when the content, i.e. the copolymeric proportion is less than 3% by weight, and particularly 2% by weight, the degree of improvement in the dyeability of the invention fibers is extremely small, whereas when 6% by weight, and particularly 7% by weight, is exceeded, the physical properties, e.g. tenacity and Young's modulus, of the resulting fiber decline and, in addition, the improvement in the dyeability of the fiber, when dyed, does not show an improvement which is proportionate to the increase in the content of the polyoxyethylene group. Moreover, such drawbacks as a decline in the sunlight fastness of the dyed product as well as susceptibility to oxidation by air when hot also arise.

Further, when, instead of modifying the polyethylene terephthalate in this invention with the polyoxyethylene group, it is modified with the other polyoxyalkylene groups, say, the polyoxypropylene group or polyoxybutylene group, not only the degree of the improvement in the dyeability of the invention fibers is small, but the drawback of the fibers becoming susceptible to air oxidation arises in this case also.

The polyethylene terephthalate to which the hereinbefore described polyoxyethylene group has been copolymerized, i.e. the modified polyethylene terephthalate to be used in the present invention, may be any of those having a molecular weight corresponding to those whose reduced viscosity value as obtained by measuring on a solution of 120 mg. of the polymer in 10 ml. of o-chlorophenol at 35° C. ranges between 0.35 and 1.5, and preferably between 0.40 and 1.3. Incidentally, a modified polyethylene terephthalate having a molecular weight corresponding to the foregoing reduced viscosity range belongs to the category of those which are usually used as polyester polymers having fiber-forming ability.

Further, the modified polyethylene terephthalate to be used in the present invention may be those in which the ethylene terephthalate units, the constituent units making up the main chain, are substituted in a small amount not exceeding 10 mol percent by the previously indicated dicarboxylic acids and oxycarboxylic acids, the acids other than terephthalic acid, or dihydric alcohols other than ethylene glycol and polyethylene glycol, which have been used for modifying polyethylene terephthalate heretofore.

As such substitutable constituent units, included are such, for example, as ethylene isophthalate, ethylene N-methyl-N,N-dibenzylamine - 4,4'-dicarboxylate, ethylenenaphthalic 2,6-dicarboxylate, ethylene succinate, ethylene adipate, ethylene p-hydroxy benzoate, trimethylene terephthalate, butylene terephthalate, hexamethylene isophthalate and p-phenylene adipate. The preparation of the foregoing polyoxyethylene compound-modified polyethylene terephthalate which contains these ester constituent units other than ethylene terephthalate is conveniently carried out in the following manner. For example, in the first step of reaction for preparing the foregoing modified polyethylene terephthalate, the reaction is carried out after adding in a prescribed amount a dicarboxylic or oxycarboxylic acid, the acid other than terephthalic acid, or an ester thereof, and/or a dihydric alcohol other than ethylene glycol.

Further, the foregoing modified polyethylene terephthalate to be used in the present invention may also be one which is modified, if necessary, to an extent as well not hinder its fiber-forming property, by a small amount of an at least trifunctional compound such, for example, as glycerine, trimethylolpropane, pentaerythritol and trimesic acid, as disclosed in, for example, U.S. Pat. 2,895,946.

(b) Linear polyamide

As the linear polyamide (b), the other polymer making up the invention fibers, any will do so long as it is one containing 5–60 mol percent, and preferably 10–50 mol percent, based on the amide bond, of aromatic radicals. Such a linear polyamide can be prepared, for instance, by a method such as described below.

(1) Conventional method of preparing polyamides using cyclic amides and ω-aminocarboxylic acid: For example, 6 nylon was polymerized heretofore by charging epsilon caprolactam and water in a polymerization vessel, followed by heating under superatmospheric pressure and thereafter reducing the pressure to normal atmospheric with the progress of the reaction and carrying on the reaction still further. Since the resulting polyamide usually contained monomer, it was extracted in a large quantity of hot water to thus obtain a pure polymer.

(2) Conventional method of preparing polyamides using diamines and dicarboxylic acids: For example, 66 nylon was prepared heretofore by charging hexamethylene diammonium adipate to a polymerization vessel where it was reacted by heating under superatmospheric pressure, followed by reducing the pressure to normal atmospheric pressure with the progress of the reaction, then continuing the reaction for several tens of minutes at this pressure, and thereafter heating for 30 minutes to several hours under a vacuum of 10–20 mm. Hg to obtain the polyamide.

When the method of (1), above, is followed, other polyamides are produced when instead of epsilon-caprolactam cyclic amides and ω-aminocarboxylic acids such for example, as enant lactam and ω-aminoundecanoic acid are used.

Likewise, other linear polyamides are obtained by the method of (2), above, when, for example, the salts of the following diamines and dicarboxylic acids are used. For example, hexamethylene diammonium sebacate, hexamethylene diammonium azelate, heptamethylene diammonium adipate and heptamethylene diammonium dodecate.

The linear polyamide of (b), above, the polyamide to be used in the present invention, can be obtained by converting the linear polyamide which is obtained either by the conventional methods of (1) or (2), above, during its preparation, into one in which 5–60 mol percent, and preferably 10–50 mol percent, of the total amide bonds [—CONR(— (where R' is hydrogen or a monovalent hydrocarbon group)] of the resulting polyamide become constituent units containing an aromatic radical. This is conveniently accomplished by adding so as to introduce to the main chain of the polyamide within the range of mol percent such as hereinabove indicated, a salt of an aminocarboxylic acid or a diamine component and/or a dicarboxylic acid component containing an aromatic radical; for example, the following compounds:

para-toluylene ammonium carboxylate
meta-xylylene diammonium adipate
meta-xylylene diammonium 2-methyl adipate
para-xylylene diammonium sebacate
hexamethylene diammonium terephthalate
hexamethylene diammonium isocinchomeronate
hexamethylene diammonium isophthalate
nonamethylene diammonium naphthalene-2,6-dicarboxylate
nonamethylene diammonium diphenylsulfone-4,4'-dicarboxylate
meta-xylylene diammonium 2,5-dichloroterephthalate
meta-xylylene diammonium isophthalate
metal-xylylene diammonium diphenylether-4,4'-dicarboxylate.

Hence, the linear polyamide to be used in the present invention may be one in which all the diamine components, which as constituents of the polyamide participate in the reaction, are those having an aromatic radical; or on the contrary all the dicarboxylic components participtating in the reaction may be those having an aromatic radical; or an optional proportion of the diamine and dicarboxylic acid components may be those possessing an aromatic radical. In short, any linear polyamide will do so long as it has 5–60 mol percent, and preferably 10–50 mol percent, of the aromatic radical based on the total of the amide bonds contained in the linear polyamide. Thus, the hereinbefore described method of preparing the aromatic radical-containing salt, which was given by way of example, is only intended for illustration and then aromatic radical-containing linear polyamide to be used in the present invention is not to be limited to only the instances where such as compound is used.

The reason why the content of the aromatic radical in the linear polyamide of (b), above, the polyamide used in the present invention, has been specified as 5–60 mol percent, and particularly 10–50 mol percent, based on the total of the amide bonds, is because when the content of the aromatic radical is less than these values, the degree of improvement in the dyeability is small, whereas when the upper limit is exceeded, kneeling and filament breakage occur in spinning the modified polyethylene with the polyamide with the consequence that fibers possessing satisfactory properties cannot be obtained. Moreover, the improvement effect of the dyeability also suffers.

The linear polyamide used in the invention should preferably be such that an amount of its terminal amino groups does not exceed 70 mol percent of an amount of the entire terminal groups. If it exceeds 70 mol percent, there occurs a defect that yarn breakage is caused or the obtained yarn has inferior physical properties when the linear polyamide is spun together with modified polyethylene terephthalate. If it is below 70 mol percent, such a defect does not occur, and it is possible to obtain filaments having good physical properties. Any known method can be employed without difficulty in preparing a polyamide in which an amount of terminal amino groups is within the above-specified range. For instance, there is employed a method in which a prescribed amount of at least one of dicarboxylic acids, monocarboxylic acids, diamines and their derivatives is added in advance to a polymerization system.

As the foregoing linear polyamide, any will do so long as it has a molecular weight corresponding to a reduced viscosity value as measured on a solution of 120 mg., of the polymer in 10 ml. of o-chlorophenol at 35° C. ranging between 0.25 and 1.3, and preferably between 0.3 and 1.2.

PROPORTION IN WHICH THE AFORESAID POLYMERS (A) AND (B) ARE BLENDED

The fibers of the present invention consist essentially of 90–70 parts by weight, and preferably 88–75 parts weight, of the aforesaid modified polyethylene terephthalate (a) and 10–30 parts by weight, and preferably 12–25 parts by weight, of the aforesaid aromatic radical-containing linear polyamide (b).

The modified polyethylene terephthalate (a) and linear polyamide (b) are blended in a proportion such as indicated above in this invention for the following reasons. When the proportion of the linear polyamide is less than 12 parts by weight, and particularly 10 parts by weight, the degree of improvement in the dyeability and anti-pilling property of the invention fibers declines. On the other hand, when the proportion of the linear polyamide exceeds 25 parts by weight, and particularly 30 parts by weight, the physical properties, and particularly the Young's modulus, creep and creep recovery, demonstrate a pronounced decline and moreover with not much improvement in the dyeability and anti-pilling property of the fibers.

Now, in preparing the invention fibers from the aforesaid two polymers (a) and (b), this is readily accomplished, for example, by mixing the chips of the modified polyethylene terephthalate of (a), above with the chips of the linear polyamide of (b), above, then feeding the mixture to an extruder where the two polymers are melt-blended followed by extruding the melt from small holes in the fibrous form.

However, in blending the foregoing two polymers (a) and (b) and forming the blend into fibers of the present invention, the following conditions must be observed.

(c) Ratio of the reduced viscosities of the the polymers (a) and (b)

In blending the polymers (a) and (b) and spinning the invention fibers, the ratio of the reduced viscosity of polymer (a) to that of polymer (b) in the fiber should be made to come within the following range.

$$0.8 \leq \frac{\text{reduced viscosity of modified polyethylene terephthalate (a)}}{\text{reduced viscosity of linear polyamide (b)}} \leq 4.0$$

and preferably $$1 \leq \frac{\text{reduced viscosity of modified polyethylene terephthalate (a)}}{\text{reduced viscosity of linear polyamide (b)}} \leq 3.6$$

The reduced viscosity as here used is obtained in the following manner:

The viscosity value obtained by measuring with an Ostwald viscometer at 35° C. a solution of 120 mg. of either the modified polyethylene terephthalate (a) or the linear polyamide (b) in 10 ml. of o-chlorophenol is substituted in the following equation to obtain the reduced viscosity.

$$\text{Reduced viscosity} = \frac{\eta_r - 1}{c}$$

wherein $\eta_r = \eta/\eta_0$, where $\eta$ is the viscosity (centipoise) at 35° C. of the solution of 120 mg. of either the foregoing polymer (a) or (b) in 10 ml. of o-chlorophenol, $\eta_0$ is the viscosity (centipoise) of o-chlorophenol at 35° C., and $c$ is concentration and is a value expressed by g./dl.

The reason for adopting a value of 0.8–4, and preferably 1–3.6, for the ratio of the reduced viscosity of the modified polyethylene terephthalate to that of the linear polyamide in the invention fiber is because if this ratio becomes smaller than 1, and particularly 0.8, the kneeling and filament breakage during spinning become excessive and, in addition, the degree of improvement of the dyeability and antipilling property declines. On the other hand, when this ratio exceeds 3.6, and particularly 4, the filament breakage during spinning likewise becomes great.

(d) Further, the modified polyethylene terephthalate (a) and the linear polyamide (b) must be blended in the invention fiber as discrete phases. The formation of the fiber in such a manner that the two polymers (a) and (b) each constitutes an independent phase is conveniently accomplished by extruding the melt from the fine holes ensuring that the melt-blending time of the two polymers (a) and (b) in the extruder does not exceed about 1.5 hours. The melting and dwell time of polymers in the conventional melting extruder is from several minutes to several tens of minutes. Thus, if the foregoing polymers (a) and (b) are melted together and extruded using the conventional extruder, a blended fiber will be obtained in which the invention-specified polymers (a) and (b) each constitutes an independent phase.

Now, when the invention fiber was immersed for 5 days at room temperature in a reagent which decomposes only the modified polyethylene terephthalate (a), e.g. 1,3-N-methanolic caustic soda, and was thereafter water-washed, the resulting sample was confirmed by analysis to be made up only the linear polyamide (b). When this sample was observed under a microscope, the presence of acicular polyamide of an average diameter of about less than 1 micron and an average length of about 10–60 microns in great numbers could be discerned. The amount of this acicular polyamide corresponded to about 95% by weight of the amount of the linear polyamide (b) that was blended with the modified polyethylene terephthalate (a).

On the other hand, when the invention fiber was immersed for about 48 hours at room temperature or in a slightly heated state in a solvent that would dissolve only the linear polyamide (b), e.g. formic acid, it was confirmed by analysis that only the linear polyamide (b) would be dissolved and that the modified polyethylene terephthalate alone would remain. When the resulting remainder was investigated in like manner under a microscope, it was observed that there were present numerous grooves in alignment with the axial direction of the fiber, the average diameter of which grooves was less than 1 micron and the average length of which was about 10–60 microns.

That is to say, the modified polyethylene terephthalate (a) and the linear polyamide (b) each form an independent phase, the former constituting the "seas" and the latter the "islands."

By way of comparison, we maintained the polymers (a) and (b) together in a melted state for 1.5 hours, after which these melted polymers were extruded through a fine hole together to obtain a thread which was drawn 4 times at 70° C. to obtain a fiber. When this fiber was treated with 1,3 N-methanolic caustic soda, a needle-shaped polyamide is not at all obtained, and treatment with formic acid does not bring about a change in the fiber. On the other hand, it was noted that this fiber was yellow in appearance and that the melting point had declined to about 200° C. In addition, it was found that the dyeability of this fiber by means of acid dyes was much less than that of the invention fibers.

(e) The birefringence of the fiber

According to our studies, it was also found that the invention fibers made from the composition consisting of blend of the hereinbefore described modified polyethylene terephthalate (a) and linear polyamide (b) had to have a birefringence $\Delta n$ of 0.110–0.160, and preferably 0.120–0.150. The reason for this is that if the birefringence $\Delta n$ is less than 0.120, and particularly 0.110, a pronounced decline takes place in the physical properties of the fiber, particularly its Young's modulus, creep and creep recovery as well as tenacity. On the other hand, when the birefringence $\Delta n$ exceeds 0.150, and particularly 0.160, a marked decline takes place in the degree improvement had in the dyeability and anti-pilling property of the fiber.

Birefringence, as here used, is a value obtained by dividing the measurement value obtained with a Senarmometer using as the light source $d$ rays (wavelength 589 m$\mu$) of sodium metal, with the diameter (unit m$\mu$) of the fiber.

In order to make the birefringence of the invention fiber fall within the above-indicated range, the thread obtained by melt-extruding the polymers (a) and (b) is drawn under suitable conditions, say, of a temperature about 70–90° C. and a draw ratio about 3–4.5 X.

PROPERTIES AND USES OF THE FIBERS OF THE PRESENT INVENTION

The fibers of the present invention which satisfy the foregoing requisites (a), (b), (c), (d) and (e) possess the good points of unmodified polyethylene terephthalate such, for example, as the latters' tenacity, elongation, Young's modulus, and solvent and chemical resistances, and furthermore their heat resistance does not decline so much as compared with that of the latter. On the other hand, as to the dyeability, the invention fibers are much more superior to the fibers made from the modified polyethylene terephthalate (a) alone and are likewise superior to the fibers made from the linear polyamide (b) alone. It was indeed unexpected that fibers excelling thus in their dyeability could be obtained essentially from a blended composition of these polymers (a) and (b).

Thus, as hereinafter to be described, the invention fibers are superior to not only the polyethylene terephthalate fiber but also the fiber made from the aforesaid modified polyethylene terephthalate (a) alone in respect of their dyeability by means of the known disperse dyestuffs. Moreover, they exhibit excellent affinity for the acid dyes and can also be dyed with the cationic dyes. Again, the anti-pilling property of the invention fibers is also exceedingly good.

Accordingly, the invention fibers find wide use as fibrous materials in the form of monofilament, multifilaments, or staple fibers. For example, as a monofilament, they are used for fasteners, nets, brushes, etc.; as monofilaments, they are used for clothing purposes in the form of woven and knit products by processing the fibers as obtained or after they have been imparted with bulkiness, etc.; or as sample fibers, they are used for spinning or are made into woven or knit products from the so spun yarn, or are used for making felt, nonwoven products, etc.

Further, the invention can also be incorporated with an antioxidant, fluorescent brightener or photostabilizer. Again, they may also contain the known delustrants, e.g. a pigment such as titanium dioxide. The foregoing antioxidant, fluorescent brightener, photostabilizer and/or pigment are incorporated in the invention fibers, for example, by mixing them in the melting extruder along with the polymers (a) and (b) or by incorporating them during the preparation of the polymers (a) or (b) by mixing them in the respective melts.

As the foregoing antioxidant, included are such, for example, as the following compounds.

"Irganox 1076"

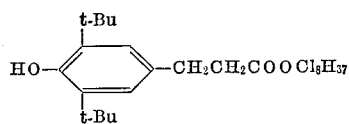

"Irganox 858"

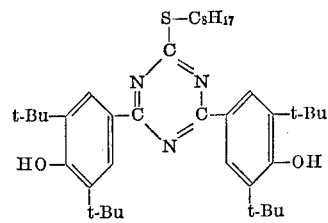

"Irganox 565"

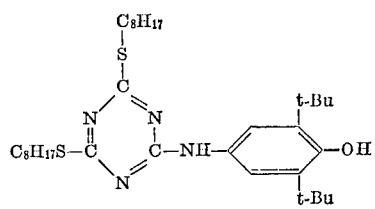

"Yoshinox SR"

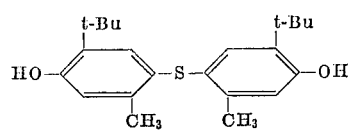

"Polygard" tri(mixed mono- and dinonylphenyl) phosphate

"DLTP" $C_{12}H_{25}OCOCH_2CH_2SCH_2CH_2COOC_{12}H_{25}$ and

"Soxinol DM"

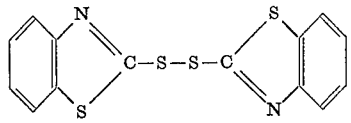

As the fluorescent brightener, useable are such, for example as:

"Tinopal CH 3513"

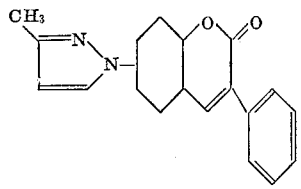

and

"Uvitex OB"

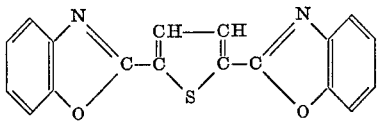

On the other hand, as the photostabilizer, useable are such as:

"Tinuvine P"

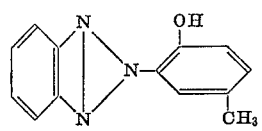

and

"Tinuvine 326"

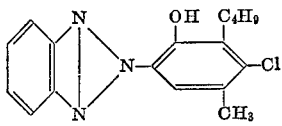

(Note: The names of the antioxidants in the quotation marks are trade names.)

According to the invention, the above-mentioned modified polyethylene terephthalate (a) and linear polyamide (b) can be made into fibers in the form of monofilament or multifilament by melt-mixing them together, if necessary, with at least one of an antioxidant, fluorescent brightening agent, photostabilizer and delusterant in a melt-extruder, and extruding the mixture through orifices into an appropriate gaseous atmosphere in a customary known manner. The fibers can be cut into staple form or cotton form.

METHOD OF DYEING THE INVENTION FIBERS

As previously indicated, the affinity of the so obtained fibrous materials of the present invention for the disperse dyes is very great. Thus, the invention fibers can be very readily dyed to deep shades without the need for such special operations and conditions as the high pressure dyeing technique at above 100° C. or the carrier technique at 100° C., which were hitherto regarded as being requirements for dyeing the polyethylene terephthalate fibers. For instance, the fibers can be dyed to the intended color deepness with a dyeing temperature of 80–100° C. at normal atmospheric pressure. A dyeing time usually of about 1–2 hours is sufficient.

Again, since the fibrous materials of this invention also have very great affinity for the acid dyes, dyeing can be carried out very easily with these dyes also, but in this case dyeing to very deep shades can be accomplished as in the case with wool by the conjoint use of a specific cationic compound in the dye bath. Hence, when, for example, a mixed spun yarn or mixed woven fabric of the invention fibrous material and wool is used, both can be dyed brightly to a single color at the same time and in a single step with the acid dyes. As the cationic compound to be used in this case, mention can be made of such, for example, as the following tertiary amines, quaternary ammonium salts, tertiary sulphonium salts, tertiary phosphines and quaternary phosphonium salts.

(1) Tertiary amines of the formula

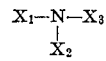

wherein $X_1$ and $X_2$ are each alkyl groups of 2–5 carbon atoms and $X_3$ is alkyl, alkenyl, aryl or alkenyl.

As the foregoing tertiary amines, mention can be made of such, for example, as tripropylamine, tributylamine, mono-propyl-di-butylamine, mono-ethyl-dibutylamine, di-butylaniline and triamylamine.

(2) Quaternary ammonium salts of the formula

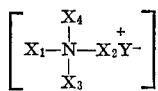

wherein $X_1$, $X_2$, $X_3$ and $X_4$ are each alkyl, alkenyl, cycloalkyl, aralkyl or allyl or the derivatives of these and Y is halogen, —OH or an alkyl sulfonic residue.

As such quaternary ammonium salts, included are such, for example as n-tetrabutylammonium chloride,
n-tributylbenzylammonium chloride,
n-lauryldimethylbenzylammonium bromide,
n-butylnaphthyldimethylammonium fluoride,
n-lauryltrimethylammonium iodide,
n-lauryldimethyl-2-chlorobenzylammonium chloride,
n-tributyl-4-chlorobenzylammonium chloride,
n-lauryltributylammonium bromide,
n-oleildimethyl-2-nitrobenzylammonium chloride,
n-tributylallylammonium bromide,
phenyldimethylbenzylammonium chloride,

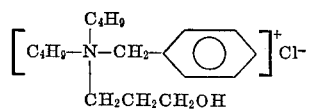

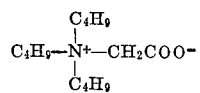

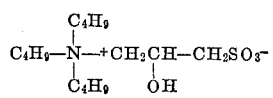

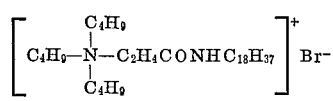

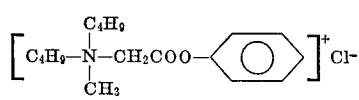

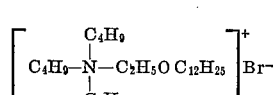

and

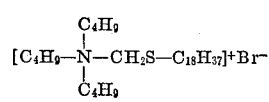

(3) Tertiary sulfonium salts of the formula

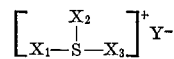

wherein $X_1$, $X_2$ and $X_3$ are each alkyl, alkenyl, allyl aralkyl, cycloalkyl or a derivative of these, and Y is halogen, —OH or an alkyl sulfonic residue.

As such tertiary sulfonium salts, mention can be made of such for example, as the following compounds.

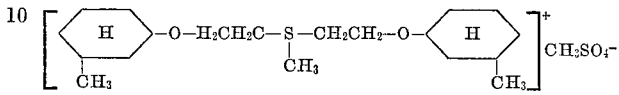

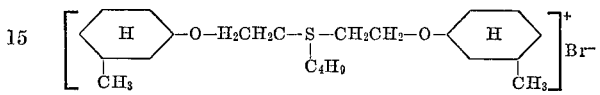

and

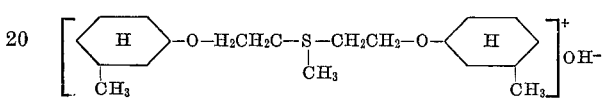

(4) Tertiary phosphines of the formula

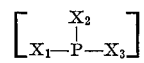

wherein $X_1$, $X_2$ and $X_3$ are each alkyl, alkenyl, allyl or a derivative of these.

(5) Quaternary phosphonium salts of the formula

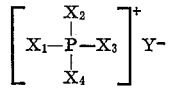

wherein $X_1$, $X_2$, $X_3$, and $X_4$ are each alkyl, allyl or derivatives of these and Y is halogen, —OH or a lower alkyl sulfonic residue.

Examples include such as triethylbenzyl-phosphonium iodide, tributylbenzyl-phosphonium bromide, tripropyl-methylphosphonium hydroxide, tributyl-stearyl-phosphonium bromide, tributyl-4-chlorobenzyl-phosphonium iodide, triphenyl-butyl-phosphonium bromide, diethyl-propyl-laurylphosphonium chloride and triphenyl-allyl-phosphonium bromide.

In using these cationic compounds conjointly with the acid dyes in dyeing the invention fibers or fibrous materials, any of the various dyeing methods such as the dip, pad or print techniques can be employed in applying the dyestuff to the yarn, fabric, etc., containing the invention fibrous materials. While the dyeing conditions will vary depending upon the class and form of the fibrous material to be dyed and the dyeing method employed, the following is, for example, the conditions in the case of the most widely practiced dip method which uses water as the medium. Namely, 1–100% o.w.f. of the foregoing cationic compound along with a prescribed amount of the acid dye is added to the dye bath, and the material is dyed at a dyeing temperature of 80–140° C., and preferably 100–130° C., until the desired color deepness is obtained. A dyeing time of usually about 1–2 hours will do.

O.w.f., as used herein, represents the percent based on the weight of the fibrous material.

In this case, the known carriers can be used as a dyeing accelerator. As such carriers can be mentioned the phenolic compounds as o- and p-phenylphenol, the chlorobenzene type compounds as monochlorobenzene and o-dichlorobenzene, the benzoic acid type compounds as benzoic acid, salicyclic acid and methyl salicylate, and the naphthalenic compounds as methyl naphthalene. These carriers are usually used on the order of 1–10 grams per liter of the dye bath. The material dyed is water-washed and soaped after its dyeing. The dyestuff referred to hereinabove as acid dyes are those which contain a cationic group, say, a sulfonic or carboxylic group in their structure and are used for preparing a neutral or acidic bath in which wool and silk are dyed.

Further, it is also possible to dye the invention fibrous materials with basic dyes by the conjoint use of specific anionic compounds. Hence, when the invention fibrous materials are used mixed spun or mixed woven with, say, the acrylic fibers, it is possible to dye both fibers brightly to a single color by a single dyeing step using the basic dyes. The anionic compounds here used include such, for example, as the following inorganic and organic acids, anionic surfactants, and phenols:

(1) Inorganic acids, e.g. sulfuric and hydrochloric acids;
(2) Organic acids, e.g. formic acid, acetic acid, benzoic acid, benzenesulfonic acid, alpha-naphthalenesulfonic acid, or the salts thereof;
(3) Anionic surfactants, e.g. the carboxylic acid salts such as the sodium salts of the higher fatty acids, sulfuric esters such as the higher alcohol sulfuric esters and sulfonated oils, and the sulfonic acid salts such as alkylbenzenesulfonate, alkylnaphthalenesulfonate and paraffin sulfonate; and
(4) Phenols, e.g. phenol, o-phenylphenol, p-phenylphenol and cresol.

In using these anionic compounds conjointly with the basic dyes in dyeing the invention fibrous materials, any of the usually practiced dyeing methods can be employed as in the case with the aforesaid acid dyes. The dyeing conditions, for example, in the case of the most widely practiced dip method which uses water as the medium are as follows. Namely, 1–100% o.w.f. of the foregoing anionic compound along with a prescribed amount of the basic dye is added to the dye bath, and the material is dyed at a dyeing temperature of 80–140° C., and preferably 100–130° C., until the desired color deepness is obtained (a) dyeing time usually of about 1–2 hours. Again, carriers which are used as a dyeing assistant when dyeing with the aforesaid acid dyes can be conjointly used in an amount usually of 1–10 grams per liter. The material, after having been dyed, is water-washed and soaped. The dyes here referred to as basic dyes are those which contain a quaternarized nitrogen atom and include those dyes which are used for dyeing the usual polyacrylonitrile type fibers.

Further, while there are instances in which the lightfastness of the invention fibrous materials declines after their dyeing, this shortcoming can be improved on either by the conjoint use of an ultraviolet absorbent during the dyeing operation or by treating the material with an ultraviolet absorbent after the dyeing. As the ultraviolet absorbents, useable are the known compounds of the hydroxybenzophenone, phenylsalicyclic acid and triazole series.

Next, before presenting the examples, the methods used in measuring the properties of the fibers shown in the examples as well as illustrative methods of preparing the several polymers used in the present invention and further typical methods of preparing the invention fibers are briefly described.

(A) Method of determining the softening point (measurement by means of a penetrometer)

After heat treating the specimen for one hour at 140° C., it is molded into a piece 2 mm. x 2 mm. x 1.5 mm., which is placed below a plunger loaded with 10 grams. The part of the plunger which comes into contact with the specimen is of a flat circular form of a diameter 3 mm. Next, the temperature of the specimen is raised at the rate of 1.2° C. per minute. The point at which the plunger makes a 0.5-mm. descent as a result of the softening of the specimen is detected electrically and the temperature at this time is designated the softening temperature (softening point).

(B) Method of measuring the melting point

The specimen was observed under a microscope equipped with a heating plate.

The temperature was raised at the rate of 10° C. per minute until a point about 20° C. below the melting point was reached and thereafter the temperature was raised at rate of 1° C. per minute.

The temperature at which the specimen begins to melt ($T_i$) and the temperature at which the melting of the specimen is completed ($T_t$) in the field of vision under the microscope were observed. The melting point was then calculated as follows:

$$Tm = (T_i + T_t)/2$$

Literature—J. W. Campbell, et al., "Preparative Methods of Polymer Chemistry," (p. 45).

(C) Method of determining the reduced viscosity 0.1200 gram of the specimen was weighed, after which it was dissolved in 10 ml. (at 35° C.) of o-chlorophenol by stirring for 90 minutes at 100° C.

After the specimen was completely dissolved in the solvent, the solution was immersed for 10 minutes in a 25° C. water bath, after which 5 ml. thereof was placed in an Ostwald viscometer, which was then immersed for 30 minutes in a 30° C. water bath, following which the efflux time ($t$) was measured. The efflux time ($t_0$) of the o-chlorophenol alone at the same temperature was also measured. The reduced viscosity was then calculated as follows:

$$\eta_r = t/t_0 \qquad (1)$$

wherein $\eta_r$ is relative viscosity.

$$\eta_{red} = \frac{\eta_r - 1}{c} \qquad (2)$$

wherein:

$\eta_{red}$ = reduced viscosity, and
$c$ = the number of grams of the polymer in solution in 100 of o-chlorophenol.

Literature—J. W. Campbell, et al., "Preparative Methods of Polymer Chemistry," (p. 35).

(D) Method of measuring the birefringence $\Delta n$

The value (unit [m$\mu$]) obtained by measurement with a Senarmometer using the $d$-rays (589 m$\mu$) of metallic sodium as the light source was divided by the diameter (unit [m$\mu$]) of the fiber to obtain the $\Delta n$.

(E) Method of measuring the disperse dye dyeability

The fiber is dipped in a dye bath of the following composition.

Dyestuff Dispersol Fast Scarlet B (C. I. Disperse Red I)—4% o.w.f.
Dispersant: Monogen—0.5 g./l.
Bath ratio—1:100

The dyeing was carried out for 90 minutes at the boil. Next, after removing the dyed fiber from the dye bath, the dye bath was allowed to cool to room temperature. Two ml. of the liquid from the dye bath was taken and, after adding 23 ml. of water and 25 ml. of acetone thereto, its light absorption at 500-m$\mu$ wavelength was measured. The concentration of the dyestuff absorbed was calculated from this numerical value.

(F) Method of dyeing with acid dyes

The fibrous material is immersed in a dye bath of the following composition.

Acid dye: Eriosin Red 2BX (C. I. Acid Red 116)—4% o.w.f.
Nonionic surfactant: nonylphenoxypolyoxyethylene glycol (average molecular weight about 650)—4% o.w.f.
Acetic acid: adjusted to pH 5
Bath ratio—1:100 (goods-to-liquor ratio)

The temperature of the bath is then gradually raised and the dyeing is carried out for 90 minutes at 120° C.

After completion of the dyeing, the fibrous material is soaped in a bath of the following composition, the treatment being carried out for 20 minutes at 80° C.
Nonionic surfactant: nonylphenoxypolyoxyethylene glycol—2 g./l.
   Bath ratio—1:100

(G) Method of dyeing with acid dyes using an assistant

The fibrous material is immersed in a dye bath of the following composition.

Acid dye: Eriosin Red 2BX (C. I. Acid Red 116)—4% o.w.f.
Nonionic surfactant: nonylphenoxypolyoxyethylene glycol (average molecular weight about 650)—4% o.w.f.
Assistant (quaternary ammonium compound): tri-n-butyl-benzyl-ammonium chloride—5% o.w.f.
Acetic acid: adjust to pH 5
   Bath ratio: 1:100 (goods-to liquor ratio)

The temperature of the bath is then gradually raised and the dyeing is carried out for 90 minutes at 120° C.

The soaping is carried out under identical conditions as in F, above.

(H) Method of dyeing with basic dyes using an assistant

The fibrous material is immersed in a dye bath of the following composition.

| Basic dye | Aizen Cathilon Pink F.G.H. (C.I. Basic Red 13). | 4% o.w.f. |
| --- | --- | --- |
| Anionic compound | Sodium laurylbenzenesulfonate | 4% o.w.f. |
| Ultraviolet absorbent | 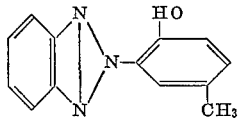 | 2% o.w.f. |
| Carrier | Methyl salicylate | 5 g./l. |

Note.—Bath ratio: 1=100 (goods to liquor ratio).

The temperature of the bath is then gradually raised and the dyeing is carried out from 90 minutes at 100° C.

The soaping is carried out under identical conditions as in F, above.

(I) Method of determining the deepness of the dyeings obtained by the methods of dyeing with acid dyes and acid dyes using an assistant Fibers dyed by means of acid dye and acid dye plus assistant are measured for their reflectance (R∞) which is then substituted in Kubelka-Munk's function to obtain K/S. The reflectance at 600-mµ wavelength is used. The Kubelka-Munk's function (K/S) is calculated as follows:

$$K/S = \frac{(1-R\infty)^2}{2R\infty} \quad (1)$$

K/S:
   <1.5—Of no practical use.
   1.5–2.5—Of practical use in only the light shades.
   2.5–3.5—Of practical use.
   3.5–4.5—Excellent.
   4.5<—Very excellent.

(J) Method of measuring light fastness

The dyed fabric (yarn) is mounted in a Fade-O-meter and exposed for 80 hours to a carbon-arc lamp. The degree of fading is then compared with the article's practical usefulness and designated a grade.

Grade:
   1—Of no practical use.
   2—Troubles will occur depending upon the use to which the article is to be put.
   3—No problems involved in its use.
   4—Excels in practical use.
   5—Excels greatly in practical use.

(M) Method of measuring fastness to washing

A piece of the dyed fabric is affixed to a white acetate cloth in the case the dyed fabric is one dyed with a disperse dye and to a white nylon fabric in the case the dyed fabric is one dyed with an acid dye. The fabric is then immersed in a bath of the following composition.

|  | G./l. |
| --- | --- |
| Marceilles soap | 0.5 |
| Anhydrous sodium carbonate | 0.2 |

Washing is carried out for 45 minutes in the bath of 70° C.±2° C., followed by water-washing and drying. The fastness to washing is then judged from the degree of contamination of the acetate or nylon cloth and the degree of fading of the dyed fabric.

(L) Method of measuring the carboxyl group

After weighing 0.1 gram of the specimen, it is dissolved in 5 ml. of benzyl alcohol by stirring for 110 seconds in an aluminum block heater of 215° C. After air cooling the solution for 20 seconds followed by cooling it rapidly for 10 seconds, it is transferred to a weighing bottle containing 10 ml. of chloroform. A further 5 ml. of m-cresol are added to the test tube, heated for 60 seconds at 215° C. with stirring and, after cooling in similar manner as described above, the contents are poured into the foregoing weighing bottle.

Next, three drops of 0.1% ethanol solution of Phenol red indicator are added to the foregoing bottle and titration is carried out with stirring using 0.1 N-solution of caustic soda in benzyl alcohol solution.

Literature—Conix, Makromol, Chem., 28 226 (1958).

(M) Method of measuring the amino group 0.3 gram of the specimen is weighed into a test tube and is dissolved by adding 5 ml. of m-cresol and stirring for 6 minutes in an aluminum block heater of 150° C. After dissolution, the contents are transferred to a 50-ml. beaker. A further 5 ml. of m-cresol are added to the test tube and heated for 1 minute at 150° C. with stirring, after which the contents of the test tube are poured into the foregoing beaker.

This was followed by adding 4 drops of an ethanol solution of 0.1% Thymol Blue indicator to the solution and carrying out the titration with stirring using 0.01 N-p-toluenesulfonic acid benzyl alcohol solution.

Literature—P. J. Flory, et al., J. Am. Chem. Soc., 70 2709 (1948).

(N) Method of measuring L, a and b

L, a and b denote those of Hunter's Color Diagram, wherein L stands for lightness, the greater the L value the color being lighter; positive side of a means red and negative side of a means green; whereas positive side of b means yellow and negative side of b means blue. The greater is the absolute value of a and b, the deeper is the color shade.

(O) Method of measuring the water content

The water content is measured by the Karl-Fischer method.

(P) Method of determining the flex abrasion resistance

The flex abrasion resistance is determined in the following manner. A specimen 40 cm. in length is mounted on an apparatus such as shown in FIG. 1 of the accompanying drawings and a fixed point of the fiber is caused to make reciprocating movements under the conditions of a load of 0.5 g./de., stroke length of 20 mm., stroke speed of 120 times per minute, edge (made of stainless steel) diameter of 1 mm. and 20° C. x 65% RH. The number of stroker required for fiber breakage is designated the flex abrasion resistance.

The smallness of the number of strokes indicates that the flex abrasion resistance is small.

When the number of strokes to breakage of the fiber is

>1500—the fiber is of no practical use because of pilling.
1000–1500—the fibers is unsatisfactory from the practical use standpoint as to its pilling resistance.
600–1000—there is no problems as far as the practical use of the fiber is concerned.
300–600—the fiber is excellent.
100–300—the fiber is very excellent.
<100—the durability of the fiber is poor because of its small flex abrasion resistance, and hence the fiber is of no practical use.

(Q) Method of measuring tenacity retention

The fiber is submitted to a dry heat treatment for 10 minutes at 200° C. in an air bath at a constant length. The ratio of the tenacity after the treatment to that before the treatment is expressed in percentage.

$$\text{Tenacity retention} = \frac{S_1}{S_2} \times 100 \, (\%)$$

where:

$S_1$ = the tenacity (g./de.) after the treatment, and
$S_2$ = the tenacity (g./de.) before the treatment.

(R) Method of measuring the elongated elasticity

A tensile testing machine is used and the specimen is mounted thereon with a distance between the clamps of 20 cm. The specimen is then stretched to 3% at a stretching speed of 10% per minute under an initial load in grams equal to 1/30 of the denier of the specimen, after which the load is immediately removed and the specimen is allowed to stand for 2 minutes. This is followed by again applying the foregoing initial load and measuring the residual elongation. The elongated elasticity is calculated as follows:

$$\text{Elongated elasticity (percent)} = \frac{l - l_1}{l} \times 100$$

where:

$l$ = the elongation (mm.) at the time of the 3% stretch, and
$l_1$ = the residual elongation (mm.).

The test is repeated ten times and the average value is adopted as the elongated elasticity.

(S) Creep and creep recovery

A load of one gram per denier is applied to a fiber one meter in length and the creep is determined by investigating the time-dependent deformation. After the passage of 2 hours, the load is removed and the creep recovery is determined by investigating in like manner the time-dependent residual deformation of the length of fiber. The determinations were made under the conditions of temperature of 20° C. and 65% RH. The relationship between creep and time, and creep recovery and time, which were determined under the foregoing conditions, are shown in FIG. 2 of the accompanying drawings.

(T) Typical method of preparing the modified polyethylene terephthalate as used in the present invention The temperature of a mixture consisting of 1500 parts of dimethyl terephthalate (DMT), 990 parts of ethylene glycol (EG), 0.435 part of calcium acetate monohydrate, 0.606 part of antimony trioxide and 0.674 part of cobalt acetate tetrahydrate is raised with stirring to initiate the ester-exchange reaction. With the progress of the reaction the temperature inside the reactor gradually rises while the methanol is being off by distillation. When the internal temperature rises to 220° C., methanol in an amount approximately equal to that calculated distills off. At this point 0.86 part of a stabilizer, trimethyl phosphate, followed by 18.8 parts of titanium dioxide (as a 20% ethylene glycol dispersion) and a prescribed amount of a polyoxyethylene compound of a prescribed average molecular weight are added with stirring, followed by raising the internal temperature to 275° C. at which temperature the system is held for 15 minutes under normal atmospheric pressure. The polycondensation reaction is then continued for 45 minutes while raising the degree of reduced pressure gradually from normal atmospheric pressure to 160 mm. Hg and thereafter for a prescribed additional period of time under a high vacuum of 0.7–0.5 mm. Hg. At this point the stirring is stopped and the pressure of the system is returned to normal atmospheric pressure with nitrogen, after which the reaction product is discharged under superatmospheric pressure over a period of about 30 minutes, which is then molded into pieces 2 mm. x 2 mm. x 2 mm. in size. The $\eta_{sp}/c$, softening point and color tone ($L, a, b$) of the so obtained modified polyethylene terephthalate are measured.

(U) Typical methods of preparing the linear polyamide as used in the present invention (U–a) Method of preparing a polyamide whose at least one monomeric component is lactam After charging a desired amount of the monomer to the polymerization vessel and purging with nitrogen, the temperature is gradually raised with stirring while adjusting the pressure inside the system so that it becomes 3.0 kg./cm.² When an internal temperature of 255° C. is reached, the pressure inside the system is reduced to normal atmospheric pressure and the polymerization reaction is continued.

After a prescribed period of time, the stirring is stopped, after which the polymer is removed and made into chips. These polymer chips are washed for 4 hours in a large quantity of hot water and thereafter dried in an 80° C. hot air dryer.

(U–b) Method of preparing a polyamide that is obtained from a diaminedicarboxylic acid After charging a polymerization vessel with a prescribed amount of the monomer and purging the inside of the system thoroughly with nitrogen, the temperature of the system is gradually raised with stirring while adjusting the internal pressure such that it is held at below 3 kg./cm.² When an internal temperature of 255° C. is reached, the pressure inside the system is reduced to normal atmospheric pressure and the polymerization reaction is continued for a further 20 minutes. Next, the pressure inside the system is reduced and at the point a pressure of 16 mm. Hg is reached after a prescribed period of time, the polymerization reaction is terminated and the polymer is removed and made into chips.

(V) Chip drying conditions (1) Drying conditions of the modified polyethylene terephthalate.

The modified polyethylene terephthalate chips are dried for 4 hours at 150° C. in a hot air dryer.

(2) Drying conditions of the linear polyamide.

The linear polyamide chips are dried for 16 hours at 80° C. in a reduced pressure drier.

(W) Spinning conditions

Method of blending the modified polyethylene terephthalate chips with the linear polyamide chips and spinning the blend.

Prescribed amounts of the modified polyethylene terephthalate chips and the linear polyamide chips are mixed in their chip form using a blender. After completion of the mixing operation, the blend is purged with nitrogen and charged to a hopper of an extruder from which it is melt-spun. The spinning temperature is 280–300° C., this being a temperature at which the spinning can be carried out stably. The melting and dwell time of the blended polymer composition is about 10 minutes. A yarn of about 220 total denier/24 filaments is obtained at a winding speed of 500 meters per minute.

(Y) Drawing and after-treatment conditions (1) Filament drawing conditions.

The undrawn filaments, after being drawn with a 90° C. pin to a prescribed draw ratio at the rate 130 meters per minute, are heat treated at a constant length with a 150° C. plate.

(2) The drawing heat-treatment and cutting conditions of staple fibers.

The undrawn filaments are drawn in hot water to a prescribed drawn ratio at the rate of 80 meters per minute, then imparted a crimp (12 crimps per inch) and thereafter treated for 20 minutes with dry heat. This is followed by cutting the filaments into 3-inch lengths.

EXAMPLE 1 AND CONTROLS 1–16

Example 1 and Controls 1–16 show that the objects of the present invention cannot be achieved unless the aforementioned conditions of (a), (b), (c), (d) and (e) are all satisfied. Whereas the fiber of Example 1 satisfies all the conditions of (a), (b), (c), (d) and (e), those of Controls 1–16 are fibers in which at least one of the five conditions of (a), (b), (c), (d) and (e) is not satisfied.

If the properties of the fibers prepared in Example 1 and Controls 1–16 are summarized, they are as follows:

one of the properties making up said item is so unsatisfactory that the fiber is practically unfit for use.

It has been demonstrated by these experiments that for achieving the objects of the present invention it was required that all the aforesaid conditions of (a), (b), (c), (d) and (e) be satisfied.

The results of the experiments which substantiate the conclusions shown in this table are fully described hereinafter.

EXAMPLE 1

Eighty-four parts of a modified polyethylene terephthalate ($\eta_{sp}/c$=0.750, softening point=261.5° C.) obtained by using as the polyoxyethylene compound in the method of preparing modified polyethylene terephthalate described in T, above, 75 parts of polyoxyethylene glycol of an average molecular weight of about 3000 and requiring a high vacuum polymerization time of 140 minutes were dried by the previously described method to obtain one whose water content was 0.006% by weight.

On the other hand, the linear polyamide obtained in accordance with the method of preparing linear polyamide as described in U–a by charging 1582 parts of epsilon-caprolactam, 1692 parts of hexamethylene diammonium terephthalate and 1500 parts of water to a polymerization vessel and polymerizing for 40 minutes at normal atmospheric pressure had $\eta_{sp}/c$=0.740 and a softening point of 207° C. This polymer was dried by the previously described method to obtain one whose water content was 0.04% by weight and whose amounts

TABLE 1

| Example or Control No. | Conditions satisfied | | | | | Conditions not satisfied | | | | | Spinning and drawing properties | Physical properties | Heat stability | Dyeability | | | Anti-pilling property | Color tone |
|---|---|---|---|---|---|---|---|---|---|---|---|---|---|---|---|---|---|---|
| | | | | | | | | | | | | | | Disperse dyes | Acid dyes | Color fastness | | |
| Example 1 | (a) | (b) | (c) | (d) | (e) | | | | | | O | O | O | O | O | O | O | O |
| Control: | | | | | | | | | | | | | | | | | | |
| 1 | | (b) | (c) | (d) | (e) | (a) | | | | | O | O | X | Δ | Δ | O | Δ | -------- |
| 2 | | (b) | (c) | (d) | (e) | (a) | | | | | O | X | O | Δ | Δ | O | Δ | -------- |
| 3 | | (b) | (c) | (d) | (e) | (a) | | | | | O | O | O | X | X | O | X | -------- |
| 4 | | (b) | (c) | (d) | (e) | (a) | | | | | Δ | X | X | O | O | X | O | -------- |
| 5 | (a) | | (c) | (d) | (e) | (b) | | | | | O | O | O | Δ | X | O | X | -------- |
| 6 | (a) | | (c) | (d) | (e) | (b) | | | | | Δ | X | X | O | O | Δ | O | -------- |
| 7 | (a) | | (c) | (d) | (e) | (b) | | | | | X | | | | | | | -------- |
| 8 | (a) | | (c) | (d) | (e) | (b) | | | | | O | O | O | Δ | Δ | O | X | -------- |
| 9 | (a) | (b) | | (d) | (e) | (c) | | | | | X | | | | | | | -------- |
| 10 | (a) | (b) | | (d) | (e) | (c) | | | | | X | | | | | | | -------- |
| 11 | (a) | (b) | (c) | | (e) | (d) | | | | | Δ | X | X | O | X | X | O | X |
| 12 | (a) | (b) | (c) | (d) | | (e) | | | | | O | O | O | Δ | Δ | O | X | -------- |
| 13 | (a) | (b) | (c) | (d) | | (e) | | | | | O | X | O | O | O | O | O | -------- |
| 14 | | | | | (e) | (a) | (b) | (c) | (d) | | O | O | O | X | X | O | X | -------- |
| 15 | | | | | (e) | (a) | (b) | (c) | (d) | | O | O | O | Δ | X | Δ | X | -------- |
| 16 | | | | | | (a) | (b) | (c) | (d) | (e) | X | X | X | O | O | O | | -------- |

Description of terms and symbols used in Table I.

Spinning and drawing properties: If there were no troubles such as filament breakage or fusion of the filaments during the spinning and drawing operation, the symbol "O" was assigned. When there was some of the foregoing troubles but it was possible to make the fiber, the "Δ" was assigned. On the other hand, when troubles were numerous and it was impossible to satisfactorily make the fiber, this was indicated by the symbol "X."

Physical properties: Tenacity, elongation, Young's modulus, elongated elasticity, melting point, creep and creep recovery.

Heat stability: The tenacity retention when the fiber has been heated at 200° C. in air.

Colorfastness: Fastness to sunlight and washing.

Color tone: Whiteness of fiber.

The meaning of the symbols O, Δ and X in the case of the several items other than the spinning and drawing properties are as follows:

O: This symbol means that the item concerned or all properties making up said item are satisfactory from the practical use standpoint.

Δ: This symbol means that the item concerned or at least one of the properties making up said item is slightly unsatisfactory from the practical use standpoint.

X: This symbol means that the item concerned or at least of carboxyl and amino groups were 186 eq./$10^6$ grams and 178 eq./$10^6$ grams, respectively.

The foregoing modified polyethylene terephthalate and linear polyamide were blended in their chip form and spun into filaments in accordance with the hereinbefore described method. It was possible to carry out the spinning satisfactorily with no trouble at all. The L, a and b of the resulting filament were respectively 73.2, +1.0 and +3.0. This filament was drawn 4.20X to prepare a drawn fiber whose $\Delta n$ was 0.138. This fiber was then dyed by means of the hereinbefore described methods and the various properties were measured, with the results shown in Tables 2–4 and accompanying FIG. 2. The amounts of the carboxyl and amino groups of this fiber were 57.2 eq./$10^6$ gram and 11.3 eq./$10^6$ gram, respectively.

This fiber was dyed in accordance with the dyeing method by means of acid dyes described in I. It is seen that the linear polyamide is dyed to a deep shade by means of acid dyes and the modified polyethylene terephthalate is dyed light, thus showing that the two polymers are present in the fiber as phases independent of each other.

Further, 10 grams of this drawn fiber were immersed in 200 ml. of a methanol solution of caustic soda (concentration 52 g./l.) for 5 days at room temperature, followed by separation by filtration, thorough washing with water to remove the water-soluble portion completely, then washing with methanol, and thereafter drying for 24 hours at 80° C. under reduced pressure.

When the so obtained fiber was observed under a microscope, aciculate of 10–60 microns were seen, and the infrared absorption spectrum of the alkali-insoluble portion was in complete agreement with that of said polyamide. Further, the yield of 1.54 grams corresponds to 96.2% of the amount added.

On the other hand, 10 grams of the drawn fiber were immersed in 500 ml. of formic acid for 20 hours at room temperature, followed by separation by filtration and thorough washing with water.

These experiments have utilized the fact that the polyamides are insoluble in alkalis but soluble in formic acid whereas the modified polyesters react with the alkalis to become alkali-soluble but are insoluble in formic acid, to prove that the two polymers are mixed together with the polymers forming phases independent of each other.

CONTROL 1

Modified polyethylene terephthalate ($\eta_{sp}/c=0.780$, softening point 261.5° C.) prepared in accordance with the method of preparing modified polyethylene terephthalate described in T by using as the polyoxyethylene compound a polyoxyethylene glycol of an average molecular weight about 12,000 and requiring 140 minutes of a high vacuum polymerization time was used in an amount of 84 parts and was blended with 16 parts of the linear polyamide used in Example 1, with the results shown in Tables 2–4.

CONTROL 2

Modified polyethylene terephthalate ($\eta_{sp}/c=0.762$, softening point 250.3° C.) prepared in accordance with with the method of preparing modified polyethylene terephthalate described in T by using as the polyoxyethylene compound 75 parts of polyoxyethylene glycol (average molecular weight about 300) and requiring 170 minutes of a high vacuum polymerization time was used in an amount of 84 parts and was blended with 16 parts of the linear polyamide used in Example 1, with with the results shown in Tables 2–4.

CONTROL 3

Modified polyethylene terephthalate ($\eta_{sp}/c=0.742$, softening point 260.2° C.) prepared in accordance with the method of preparing modified polyethylene terephthalate described in T by using as the polyoxyethylene compound 15 parts of polyoxyethylene glycol (average molecular weight about 3000) and requiring a high vacuum polymerization time of 160 minutes was used and was blended with the linear polyamide used in Example 1, with the results shown in Tables 2–4.

CONTROL 4

Modified polyethylene terephthalate ($\eta_{sp}/c=1.080$, softening point 257.8° C.) obtained in accordance with the method of preparing modified polyethylene terephthalate described in T by using as the polyoxyethylene compound 150 parts of polyoxyethylene glycol (average molecular weight about 3000) and requiring a high vacuum polymerization time of 230 minutes was used and this was blended with the linear polyamide which was in Example 1, with the results shown in Tables 2–4.

CONTROL 5

Except that 95 parts of the modified polyethylene terephthalate and 5 parts of the linear polyamide were used in Example 1, the experiment was otherwise carried out as described therein in blending spinning and drawing the fiber whose properties are shown in Tables 2–4.

CONTROL 6

Example 1 was repeated except that 60 parts of the modified polyethylene terephthalate and 40 parts of the polyamide were used. The properties of the resulting fiber are shown in Tables 2–4.

CONTROL 7

Eighty-four parts of a dried product of modified polyethylene terephthalate ($\eta_{sp}/c=0.750$) prepared as in Example 1 and 16 parts of a dried product of a copolycondensed polyamide ($\eta_{sp}/c=0.553$) prepared in accordance with the method of U–b by charging the polymerization vessel with 657 parts of meta-xylylene diammonium isophthalate and 613 parts of meta-xylylene diammonium adipate were blended together in chip form, after which the blend was spun. Although the spinning was carried out while raising the spinning temperature from 280° C. to 295° C. in 5° C. increments, there were numerous occurrences of kneeling and, in addition, filament breakage would occur when a draft was applied, and hence it was impossible to form the melt into filaments.

CONTROL 8

Eighty-four parts of a dried product of modified polyethylene terephthalate ($\eta_{sp}/c=0.750$) prepared as in Example 1 and 141 parts of a dried product of copolycondensed polyamide prepared in accordance with the method of U–a from a charge consisting of 1074 parts of epsiloncaprolactam and 141 parts of hexamethylene diammonium terephthalate were blended in the form of chips and then the blend was spun. Hardly any trouble occurred during the spinning operation. The freshly spun filaments were drawn 5.2X and a drawn fiber having $\Delta n=0.145$ was obtained. The results obtained when the properties of this fiber were measured are shown in Tables 2–4.

EXAMPLE 9

In preparing the modified polyethylene terephthalate as in Example 1, a high vacuum polymerization time of 300 minutes was used to prepare a polymer having $$\eta_{sp}/c=1.470$$

and a softening point of 260.2° C. On the other hand, in preparing the linear polyamide, a normal atmospheric pressure time of 10 minutes was used to prepare a polymer having $\eta_{sp}/c=0.350$. When the two polymers were blended as in Example 1, the blend could not be spun as a result of numerous filament breaks at the spinning holes.

CONTROL 10

Modified polyethylene terephthalave having $$\eta_{sp}/c=0.578$$

was prepared as in Example 1 using a high vacuum polymerization time of 110 minutes. On the other hand, a linear polyamide having $\eta_{sp}/c=1.010$ was prepared using a normal atmospheric pressure polymerization time of 80 minutes. When these polymers were blended as in Example 1, the spinning of this blend could not be carried out because of filament breakages.

CONTROL 11

Filaments obtained by adjusting the melting and dwell time to about 90 minutes when conducting the spinning as in Example 1 were drawn to a draw ratio of 4.0× with a pin temperature of 70° C. in accordance with the drawing method described in X. The so obtained fiber had a low melting point and its properties were inferior. This fiber was dyed in accordance with the method of dyeing with acid dyes as described in I. This fiber was merely dyed to a light shade by means of the acid dyes. Further, the photograph of a section of the fiber shows that the two polymers did not constitute independent phases in the fiber but that the phase was homogeneous. Further, the values of L, $a$ and $b$ were respectively 58.4, $+2.5$ and $+19.3$ and hence were inferior. The results obtained when the properties of this fiber were measured are shown in Tables 2–4. Again, when as in Example 1, 10 grams of this fiber were immersed in 200 ml. of a methanol solution of caustic soda (concentration 52 g./l.) for 5 days at room temperature, followed by separation by filtration and washing of the residue with water, the polymer was dissolved completely in water with only titanium dioxide remaining. On the other hand, when, as in Example 1, 10 grams of this fiber were immersed in 500 ml. of formic acid for 20 hours at room temperature, the narrow grooves in the surface such as seen in case of the fiber of Example 1 were absent. The results of these two dissolution experiments also indicated that the polyamide no longer was present in the fiber as an independent phase.

CONTROL 12

The undrawn filaments obtained in Example 1 were drawn 5.48X and a fiber having $\Delta n = 0.162$ was obtained. The results obtained when the properties of this fiber were measured are shown in Tables 2–4.

CONTROL 13

The undrawn filaments obtained in Example 1 were drawn 3.05X and a fiber having $\Delta n = 0.097$ was obtained. The results obtained when the properties of this fiber were measured are shown in Table 2–4. Further, the creep and creep recovery of this fiber are graphically depicted in FIG. 2.

CONTROL 14

Modified polyethylene terephthalate ($\eta_{sp}/c = 0.710$, softening point 261.8° C.) obtained in accordance with the method described in T by requiring a high vacuum polymerization time of 140 minutes but without the addition of polyoxyethylene glycol was spun and drawn in customary manner. The dyeability of the so obtained fiber was very poor. The results obtained when the properties of this fiber was measured are shown in Tables 2–4.

CONTROL 15

The dyeability of the fiber obtained by spinning and drawing in customary manner the modified polyethylene terephthalate obtained in Example 1 was improved over that of the fiber of Control 14 in the case of disperse dyes but showed no improvement in the case of acid dyes. The results obtained when the properties of this fiber were measured are shown in Tables 2–4.

CONTROL 16

The properties of the fiber obtained by spinning and drawing the linear polyamide of Example 1 in customary manner are shown in Tables 2–4.

TABLE 2

| Experiment | Modified polyethylene terephthalate | | | Linear polyamide | | | Spinning and drawing properties | Melting point (° C.) | $\eta_{sp}/c$ | $\Delta n$ | Draw ratio |
|---|---|---|---|---|---|---|---|---|---|---|---|
| | Amount (part) | Softening point (° C.) | $\eta_{sp}/c$ | Amount (part) | Softening point (° C.) | $\eta_{sp}/c$ | | | | | |
| Example 1 | 84 | 261.5 | 0.750 | 16 | 207 | 0.740 | Satisfactory | 261 | 0.70 | 0.138 | 4.20 |
| Control: | | | | | | | | | | | |
| 1 | 84 | 261.5 | 0.780 | 16 | 207 | 0.740 | do | 261 | 0.70 | 0.137 | 4.20 |
| 2 | 84 | 250.3 | 0.762 | 16 | 207 | 0.740 | do | 250 | 0.67 | 0.137 | 4.50 |
| 3 | 84 | 260.2 | 0.742 | 16 | 207 | 0.740 | do | 261 | 0.68 | 0.135 | 4.20 |
| 4 | 85 | 257.8 | 1.080 | 16 | 207 | 0.740 | (²) | 257 | 0.60 | 0.128 | 4.00 |
| 5 | 95 | 261.5 | 0.750 | 5 | 207 | 0.740 | Satisfactory | 261 | 0.67 | 0.142 | 4.50 |
| 6 | 60 | 261.5 | 0.750 | 40 | 207 | 0.740 | (³) | 260 | 0.65 | 0.113 | 3.80 |
| 7 | 84 | 261.5 | 0.750 | 16 | 197 | 0.553 | (³) | | | | |
| 8 | 84 | 261.5 | 0.750 | 16 | 195 | 0.852 | Satisfactory | 261 | 0.71 | 0.134 | 4.20 |
| 9 | 84 | 260.2 | 1.470 | 16 | 210 | 0.350 | (⁴) | | | | |
| 10 | 84 | 261.3 | 0.578 | 16 | 209 | 1.010 | (⁴) | 228 | 0.53 | 0.127 | 4.00 |
| 11 | 84 | 261.5 | 0.750 | 16 | 207 | 0.740 | (²) | 261 | 0.71 | 0.162 | 5.48 |
| 12 | 84 | 261.5 | 0.750 | 16 | 207 | 0.740 | Satisfactory | 261 | 0.65 | 0.097 | 3.05 |
| 13 | 84 | 261.5 | 0.750 | 16 | 207 | 0.740 | do | 262 | 0.70 | 0.155 | 4.50 |
| 14 | | 261.8 | 0.710 | | | | do | 261 | 0.69 | 0.150 | 4.50 |
| 15 | 100 | 261.5 | 0.750 | | | | do | (⁶) | | | |
| 16 | | | | 100 | 270 | 0.740 | (⁵) | 207 | 0.70 | 0.081 | 4.50 |

¹ 100 (PET).
² Frequent breaks and adhesion of filament during drawing.
³ Frequent breakage of filaments during spinning and drawing.
⁴ Frequent breakage of filaments during spinning, and a drawn fiber could not be obtained.
⁵ Drawability extremely poor due to sticking of filaments to each other.
⁶ As the melting point was not clear, the softening point has been indicated.

TABLE 3

| Experiment | Tenacity (g./de.) | Elongation (percent) | Young's modulus (kg./mm.²) | Elongation elasticity (percent) | Flex abrasion resistance (No. of strokes) | Percent Tenacity retention | Creep | Creep recovery |
|---|---|---|---|---|---|---|---|---|
| Example 1 | 3.5 | 24 | 1,220 | 99 | 593 | 92 | 1.60 | 0.12 |
| Control: | | | | | | | | |
| 1 | 3.3 | 22 | 1,130 | 99 | 852 | 76 | 1.61 | 0.13 |
| 2 | 2.7 | 31 | 870 | 96 | 906 | 90 | 2.85 | 0.12 |
| 3 | 4.1 | 23 | 1,250 | 99 | 2,164 | 93 | 1.57 | 0.12 |
| 4 | 1.6 | 47 | 380 | 98 | 95 | 58 | 4.05 | 0.48 |
| 5 | 3.7 | 23 | 1,170 | 99 | 1,459 | 89 | 1.59 | 0.12 |
| 6 | 1.5 | 50 | 550 | 89 | 528 | 81 | 3.88 | 0.38 |
| 7 | | | | | | | | |
| 8 | 3.5 | 26 | 1,240 | 99 | 1,120 | 90 | 1.61 | 0.12 |
| 9 | | | | | | | | |
| 10 | | | | | | | | |
| 11 | 2.1 | 61 | 560 | 88 | 336 | 82 | 4.16 | 0.50 |
| 12 | 4.3 | 17 | 1,380 | 98 | 1,053 | 89 | 1.43 | 0.11 |
| 13 | 1.4 | 40 | 750 | 95 | 431 | 88 | 3.80 | 0.22 |
| 14 | 3.5 | 33 | 1,150 | 90 | 2,850 | 95 | 1.40 | 0.12 |
| 15 | 3.5 | 24 | 1,200 | 99 | 1,220 | 90 | 1.52 | 0.12 |
| 16 | 3.6 | 32 | 300 | 99 | (¹) | (¹) | (¹) | (¹) |

¹ Not measured.

TABLE 4

| Experiment | Fastness to sunlight | | Fastness to washing | | Dyeability | | | |
|---|---|---|---|---|---|---|---|---|
| | Disperse dyes (grade) | Acid dyes (grade) | Disperse dyes (grade) | Acid dyes (grade) | Disperse dyes (percent) | Acid dyes (K/S) | Acid dyes plus assistant (K/S) | Basic dyes plus assistant |
| Example 1 | 4–5 | 5 | 5 | 5 | 90.4 | 2.6 | 3.9 | Deep shade. |
| Control: | | | | | | | | |
| 1 | 4 | ¹4 | 4 | ¹5 | 86.1 | 1.7 | 2.0 | Medium shade. |
| 2 | 4–5 | ¹4 | 5 | ¹5 | 85.2 | 2.0 | 2.4 | Do. |
| 3 | 4–5 | ¹5 | 5 | ¹5 | 74.0 | 0.5 | 1.0 | Light shade. |
| 4 | 2 | 3 | 2 | 3 | 90.2 | 3.0 | 4.2 | Deep shade. |
| 5 | 4 | ¹5 | 4 | ¹5 | 87.6 | 0.8 | 1.2 | Light shade. |
| 6 | 4 | 5 | 3 | 3 | 90.8 | 2.8 | 4.1 | Deep shade. |
| 7 | | | | | | | | |
| 8 | 4 | ¹5 | 5 | ¹5 | 87.0 | 1.0 | 2.2 | Medium shade. |
| 9 | | | | | | | | |
| 10 | | | | | | | | |
| 11 | 11 | 2 | 4 | 4 | 93.1 | 0.9 | 4.3 | Deep shade. |
| 12 | 4–5 | ¹5 | 5 | ¹5 | 83.5 | 1.4 | 2.0 | Medium shade. |
| 13 | 4–5 | 5 | 5 | 5 | 91.0 | 2.7 | 4.1 | Deep shade. |
| 14 | 5 | ¹5 | 5 | ¹5 | 66.2 | 0.1 | 0.4 | Not dyed. |
| 15 | 3 | 3 | 5 | ¹5 | 87.6 | 0.1 | 1.1 | Light shade. |
| 16 | 5 | ¹5 | 4 | 4 | 87.5 | 4.5 | 75.0 | Deep shade. |

¹ In view of inadequate dyeability, determination was made with a specimen dyed to a light shade.

EXAMPLE 2

Eighty-five parts of modified polyethylene terephthalate ($\eta_{sp}/c=0.926$, softening point 260.0° C.) obtained by using as the polyoxyethylene compound in the method of preparing modified polyethylene terephthalate described in T, 90 parts of polyoxyethylene glycol of an average molecular weight of about 1000 and requiring 220 minutes as the high vacuum polymerization time were dried by the previously described method and the water content thereof was reduced to 0.007% by weight. On the other hand, 15 parts of the polyamide prepared as in Example 1 were dried by the aforesaid method and the water content thereof was reduced to 0.04% by weight. These polymers were then blended in their chip form and the blend was spun as in Example 1. The so obtained filaments were drawn 4.24X and a drawn fiber having $\Delta n=0.134$ was obtained. The results obtained when the properties of this fiber were measured are shown in Tables 7–9.

EXAMPLE 3

Eighty-five parts of modified polyethylene terephthalate ($\eta_{sp}/c=0.850$, softening point 259.0° C.) obtained by using as the polyethylene compound in the method of preparing modified polyethylene terephthalate described in T, 80 parts of a polyethylene glycol of an average molecular weight of about 5000 and requiring 180 minutes as the high vacuum polymerization time were dried by the previously described method and the water content was reduced to 0.009% by weight. On the other hand, 15 parts of the polyamide prepared as in Example 1 were dried by the aforesaid method and the water content thereof was reduced to 0.04% by weight. These polymers were then blended in chip form and the blend was spun as in Example 1. The so obtained undrawn filament were drawn 4.18X and a drawn fiber having $\Delta n=0.133$ was obtained. The results obtained when the properties of this fiber were measured are shown in Tables 7–9.

EXAMPLE 4

Eighty-five parts of modified polyethylene terephthalate ($\eta_{sp}/c=0.988$, softening point 260.1° C.) obtained by adding as the polyoxyethylene compound in the method of preparing modified polyethylene terephthalate described in T, 75 parts of methpolyoxyethylene glycol (average molecular weight of about 1500) and 1.7 parts of pentaerythritol and requiring 170 minutes as the high vacuum polymerization time were dried by the previously described method and the water content thereof was reduced to 0.009% by weight. On the other hand, 15 parts of the polyamide prepared in Example 1 was dried by the aforesaid method and the water thereof was reduced to 0.05% by weight. These polymers were then blended in chip form and the blend was spun as in Example 1.

The so obtained undrawn filaments were drawn 3.80X and a drawn fiber having $\Delta n=0.132$ was obtained. The results obtained when the properties of this fiber were measured are shown in Tables 7–9.

CONTROL 17

Eighty-four parts of modified polyethylene terephthalate ($\eta_{sp}/c=0.989$, softening point 260.5° C.) obtained by using as the polyoxyethylene compound in the method of preparing modified polyethylene terephthalate described in T, 75 parts of polyoxypropylene glycol (average molecular weight of about 5000 and requiring 180 minutes as the high vacuum polymerization time were dried by the previously described method and the water content thereof was reduced to 0.008% by weight. On the other hand, 16 parts of the polyamide prepared as in Example 1 were dried by the aforesaid method and the water content thereof was reduced to 0.004% by weight.

These polymers were blended in chip form and the blend was spun by the hereinbefore described procedure. The resulting undrawn filaments were drawn 4.21X and a drawn fiber having $\Delta n=0.132$ was obtained. The results obtained when the properties of this fiber were measured are shown in Tables 7–9.

This control is for illustrating that excellent dyeability and anti-pilling property are demonstrated in the case of the fiber which satisfies all the aforesaid conditions of (a), (b), (c), (d) and (e), but that in the case where the fiber satisfied the aforesaid conditions of (b), (c), (d) and (e) but does not satisfy the condition (a), it does not demonstrate the aforesaid superior properties.

EXAMPLE 5

Sixteen parts of linear polyamide ($\eta_{sp}/c=0.685$) obtained by using as a charge in the method of preparing linear polyamide described in U–a, 904 parts of epsilon-caprolactam, 564 parts of hexamethylene diammonium terephthalate and 300 parts of water, and with a normal atmospheric pressure polymerization time of 40 minutes were dried by the previously described method.

On the other hand, 84 parts of modified polyethylene terephthalate prepared as in Example 1 were dried by the foresaid method. These polymers were then blended in chip form and the blend was spun. The freshly spun filaments were drawn 4.00X and a fiber having $\Delta n=0.130$ was obtained. The results obtained when the properties of this fiber were measured are shown in Tables 7–9.

EXAMPLE 6

In the method of preparing linear polyamide described in U–b, 750 parts of hexamethylene diammonium isophthalate were charged to the polymerization vessel as the monomer and polymerized. The internal temperature reached 255° C. in 80 minutes after the agitation was started. After polymerizing for 20 minutes at normal atmospheric pressure, the polymerization was continued for a further 70 minutes under reduced pressure to complete the reaction. Sixteen parts of the so obtained linear polyamide ($\eta_{sp}/c=0.833$) were dried by the previously indicated method. On the other hand, 84 parts of modified polyethylene terephthalate prepared as in Example 1 were dried under the foregoing conditions. These polymers were than blended in chip form and the blend was spun. The freshly spun filaments were drawn 4.53X and a fiber having $\Delta n=0.150$ was obtained. The results obtained when the properties of this fiber were measured are shown in Tables 7–9.

EXAMPLE 7

Except that 75 parts of the modified polyethylene terephthalate and 25 parts of the linear polyamide both of which were prepared as in Example 1 were used, the experiment was otherwise carried out as in Example 1 in spinning filaments which were drawn 4.32X to yield a fiber having $\Delta n=0.134$. The results obtained when the properties of this fiber were measured are shown in Tables 7–9.

EXAMPLE 8

Except that 87 parts of the modified polyethylene terephthalate and 13 parts of the linear polyamide both of which were prepared as in Example 1 were used, the experiment was otherwise carried out as in Example 1 in spinning filaments which were drawn 4.30X to yield a fiber having $\Delta n=0.146$. The results obtained when the properties of this fiber were measured are shown in Tables 7–9.

Further, the carboxyl group and amino group contents of this fiber were respectively 55.2 eq./$10^6$ grams and 10.8 eq./$10^6$ grams.

EXAMPLES 9–12

Example 1 was repeated and filaments were spun and drawn in accordance with the procedure described therein, except that as the modified polyethylene terephthalate and linear polyamide polymers were used those having $\eta_{sp}/c$ differing from that of the two polymers used in Example 1. The results obtained when the properties of the resulting fibers were measured are shown in Table 5 and Tables 7–9.

TABLE 5

| Experiment: | $\eta_{sp}/c$ of modified polyethylene terephthalate (1) | $\eta_{sp}/c$ of linear polyamide (2) | (1)/(2) | Spinning property |
|---|---|---|---|---|
| Example: | | | | |
| 9 | 1.089 | 0.479 | 2.3 | Satisfactory. |
| 10 | 0.635 | 0.536 | 1.2 | Do. |
| 11 | 0.818 | 0.689 | 1.2 | Do. |
| 12 | 1.385 | 0.382 | 3.6 | Do. |
| 13 | 0.750 | 0.740 | 1.0 | Do. |
| Control: | | | | |
| 9 | 1.470 | 0.350 | 4.2 | Poor. |
| 10 | 0.578 | 1.010 | 0.6 | Do. |

When these examples are compared with Controls 9 and 10, it can be seen that the ratio of the reduced viscosity of the modified polyethylene terephthalate to the reduced viscosity of the linear polyamide to be blended is an important factor in achieving the objects of the present invention. Generally, when two classes of polymer are to be blended, better results are usually had where the melt viscosities of the two polymers are about the same as compared with the case where there is a marked difference in the melt viscosities. However, the modified polyethylene terephthalate and linear polyamide used in the examples of the present invention and Controls 9 and 10 are polymers having the same composition, the only difference being in their degree of polymerization. And when the reduced viscosity and the melt viscosity at 270° C. of these polymers are compared, they are as shown in Table 6. Hence, as far as the several polymers that were used in these examples are concerned, it can be said that favorable results are had when the melt viscosity of the linear polyamide is very much lower than that of the modified polyethylene terephthalate.

TABLE 6

| Modified polyethylene terephthalate | | Linear polyamide | |
|---|---|---|---|
| Reduced viscosity | Melt viscosity (poise) | Reduced viscosity | Melt viscosity (poise) |
| 0.5 | 360 | 0.5 | 180 |
| 0.6 | 820 | 0.6 | 340 |
| 0.8 | 3080 | 0.8 | 650 |
| 1.0 | 8500 | 1.0 | 2000 |

EXAMPLES 13 AND 14

Undrawn filaments prepared as in Example 1 were drawn 3.15X and 5.00X, respectively, to yield fibers having $\Delta n=0.116$ and 0.152.

The results obtained when the properties of these fibers were measured are shown in Tables 7–9.

EXAMPLE 15

Modified polyethylene terephthalate ($\eta_{sp}/c=0.81$, softening point 259.4° C.) obtained in accordance with the method of preparing modified polyethylene terephthalate described in Example 1 excepting that 0.9 part of "Tinopal CH 3513" (produced by Geigy Company) was added as a fluorescent brightener to the system during the initial stage of the polycondensation reaction which was carried out at a pressure of 0.7–0.5 mm. Hg was used instead of the modified polyethylene terephthalate of Example 1, but otherwise the procedure described therein was followed to obtain a fiber, the properties of which are shown in Tables 7–9. Further, L, a and b values of this fiber were 74.7, −0.7 and +2.5, respectively.

EXAMPLE 16

Modified polyethylene terephthalate ($\eta_{sp}/c=0.933$, softening point 259.2° C.) obtained in accordance with the method of preparing modified polyethylene terephthalate described in Example 1 excepting that 0.6 part of "Irganox 565" (produced by Geigy Company) was added at a point immediately prior to reduction of the pressure of the polymerization system was used instead of the modified polyethylene terephthalate of Example 1, but otherwise the procedure described therein was followed to obtain a fiber, the properties of which are shown in Tables 7–9.

EXAMPLE 17

The undrawn filaments obtained in Example 1 were drawn 3.9X and a staple fiber was obtained. The properties of this staple fiber are shown in Tables 7–9.

The fiber obtained in the foregoing manner was spun and rendered into a yarn of the following description:

Cotton count—30/2S
Number of twists:
 Under twist—18T/inch
 Upper twist—19T/inch This yarn was then made into a fabric under the following conditions:

Fabric structure—gabardine
Fabric density:
 Warp—104 ends/inch
 Woof—56 picks/inch The above fabric was given a tumbling treatment in a tumbler type pilling tester for 30 minutes. When the number of pills on the surface of a 5 cm. x 5 cm. fabric was counted after this treatment, there was only one pill.

CONTROL 18

A staple fiber was obtained by drawing the undrawn filaments obtained in Control 13 3.90X. The properties of this staple fiber are shown in Tables 7–9. The fiber obtained as hereinabove described was woven into a garbardine fabric under exactly the same conditions as in Example 17. This fabric was given a tumbling treatment for 30 minutes in a tumbler type pilling tester. The result was that pill occurrences of 11/5 cm. x 5 cm. was observed in this fabric. This control demonstrates that, even in the case of staple fiber, that which satisfies all the conditions of (a), (b), (c), (d) and (e), the constituent requirements of the present invention, possesses excellent dyeability and anti-pilling property, whereas the staple fiber which satisfies the aforesaid conditions (a), (c), (d) and (e) but not (b) was inadequate in its dyeability as well as anti-pilling property.

EXAMPLE 18

In the method of preparing the modified polyethylene terephthalate used in Example 1, as the starting material were charged DMT, EG and polyoxyethylene glycol, (average molecular weight about 3000) as well as the catalyst, stabilizer and $TiO_2$ in exactly the same amounts and, in addition, 2 parts of pentaerythritol which was added at the beginning of the ester-interchange reaction (first step). The polycondensation reaction (second step) using the foregoing starting material composition was then carried out exactly as in Example 1 except that the reaction under a high vacuum of 0.5–0.7 mm. Hg was carried out for 110 minutes to prepare the modified polyethylene terephthalate, the properties of which are shown in Table 7. This modified polyethylene terephthalate was blended with the same linear polyamide as was used in Example 1 in the same proportion as used therein, following which the blend was spun under identical conditions as in Example 1. The so obtained undrawn filaments were drawn 3.7X under the previously indicated staple fiber production conditions, followed by crimping, heat-setting, and thereafter cutting into 3-inch lengths to yield a staple fiber. The properties of this staple fiber are shown in Tables 7–9. Although this staple fiber did not differ from the staple fiber of Example 17 in its dyeability, it excelled the latter in its creep and creep recovery as well as anti-pilling property.

EXAMPLE 19

Eighty-four parts of modified polyethylene terephthalate ($\eta_{sp}/c=0.742$, softening point 246.3° C.) obtained by using in the method of preparing modified polyethylene terephthalate described in T, 1425 parts of DMT and 75 parts of dimethyl isophthalate instead of 1500 parts of DMT and as the polyoxyethylene compound 75 parts of polyoxyethylene glycol, and by requiring a polymerization time under high vacuum of 0.7–0.5 mm. Hg of 150 minutes, and 16 parts of linear polyamide prepared as in Example 1 were both dried by the previously indicated methods. These polymers were then blended in chip form, after which the blend was spun as hereinbefore described. The so obtained undrawn filaments were drawn 4.25X and a fiber having $\Delta n=0.135$ was obtained. The results obtained when the properties of this fiber were measured are shown in Tables 7–9.

EXAMPLE 20

Modified polyethylene terephthalate ($\eta_{sp}/c=0.783$, softening point 257.7° C.) was prepared by the method of preparing modified polyethylene terephthalate described in T by using as the polyoxyethylene compound 75 parts of N-methyl-N,N-di-polyoxyethylene glycol (average molecular weight about 2500)

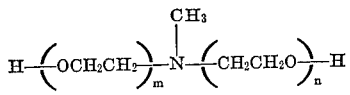

and as catalyst 0.15 part of titanium tetraethoxide (added as an ethanol solution) instead of the calcium acetate monohydrate and antimony trioxide, and by requiring 140 minutes for the high vacuum polymerization time. Eighty-five parts of the so obtained modified polyethylene terephthalate and 15 parts of linear polyamide prepared as in Example 1 were then both dried as previously described. After blending these polymers in chip form, the blend was spun in accordance with the previously indicated procedure. The resulting undrawn filaments were drawn 4.31X to obtain a fiber having $\Delta n=0.136$. The results obtained when the properties of this fiber were measured are shown in Tables 7–9.

EXAMPLE 21

Eighty-four parts of modified polyethylene terephthalate ($\eta_{sp}/c=0.783$ softening point 260.8° C.) obtained by using as the polyoxyethylene compound in the method of preparing modified polyethylene terephthalate described in T, 75 parts of dicarbomethoxypolyoxyethylene glycol (average molecular weight about 2200)

and requiring as the high vacuum polymerization time 150 minutes were used, and a fiber was obtained from a blend of this modified polyethylene terephthalate with 16 parts of linear polyamide as used in Example 1. The results obtained when the properties of this fiber were measured are shown in Tables 7–9.

EXAMPLE 22

Modified polyethylene terephthalate having $$\eta_{sp}/c=0.786$$

and a softening point of 259.8° C. was obtained by charging the polymerization vessel in the method of preparing modified polyethylene terephthalate described in T, with 1500 parts of DMT, 990 parts of EG, 0.189 part of manganese acetate, 0.77 part of calcium acetate and 0.322 part of germanium dioxide; by adding after the ester-interchange reaction 18.8 parts of titanium dioxide, 2.59 parts of trimethyl phosphate, 75 parts of polyoxyethylene glycol and 0.6 part of Irganox 565 (Geigy Company); and by requiring a high vacuum polymerization time of 190 minutes.

Eighty-four parts of the so obtained polyester was melt-spun as in Example 1 with 16 parts of the linear polyamide used in Example 1. The resulting undrawn filaments had L, a and b values of 85.3, 1.0 and +0.8, respectively, and its whiteness was extremely satisfactory. When the $\Delta n$ was measured after drawing 4.30X, it was 0.141. The results obtained when the properties of this fiber were measured are shown in Tables 7–9.

EXAMPLE 23

Epsilon-caprolactam (1582 parts), 1692 parts of hexamethylene diammonium terephthalate, 810 parts of polyoxyethylene glycol having an average molecular weight of about 3,000 and 1400 parts of water were charged into a polymerization vessel, and heated gradually at atmospheric pressure in an atmosphere of nitrogen while stirring. In 120 minutes when almost all of the added water was off by distillation, the temperature inside the vessel was raised to 220° C., and the polymerization was continued further for 240 minutes. Thereafter, the pressure in the system was reduced. The unreacted matter was removed, and the polymerization was terminated.

The obtained composition had an $\eta_{sp}/c$ of 0.621. It was subjected to a crusher, and pulverized to an average particle size of 2 x 2 x 2 (mm.), followed by drying at reduced pressure for 2 hours at 80° C. until the water content reached 0.012% by weight. Twenty parts of the obtained pulverized composition was added to 80 parts of molten polyethylene terephthalate (containing 0.035% by weight/DMT of Irganox 565 having an $\eta_{sp}/c$ of 1.050, and they were mixed by stirring under reduced pressure for 40 minutes at 275° C. The obtained composition had an $\eta_{sp}/c$ of 0.920. It was melt-spun at 280° C., and a 210 de./24 fil filament was obtained. The filament was drawn to 4.30 times the original length with a pin at 90° C. and heat-treated with a plate at 150° C. while its length is being maintained constant. The physical properties and other data of the obtained filaments are shown in Tables 7–9.

When the foregoing composition was extracted with dioxane, almost all of the polyoxyethylene glycol added was recovered. The residual composition had an $\eta_{sp}/c=0.703$.

EXAMPLE 24

In accordance with the preparation of a linear polyamide in U–a given above 1582 parts of epsilon-caprolactam, 1692 parts of hexamethylene diammonium terephthalate, 33 parts of terephthalic acid and 1500 parts of water were charged, and polymerized for 140 minutes at atmospheric pressure, followed by washing in the foregoing manner. The resulting linear polyamide had an $\eta_{sp}/c$ of 0.761, a softening point of 211° C., a carboxyl group content of 237 eq./$10^6$ gr., and an amino group content of 104 eq./$10^6$ gr.

Eighty-five parts of the modified polyethylene terephthalate prepared in Example 2 was dried by the foregoing method, and blended with 15 parts of the above-mentioned linear polyamide. The blend in chip form was spun, and the obtained filament was drawn to 4.21 times the original length. The obtained filament had $\Delta n$ of 0.132. The physical properties and other data of the obtained filaments are shown in Tables 7–9.

EXAMPLE 25

In accordance with the preparation of a linear polyamide in U–a mentioned above, 1582 parts of epsilon-caprolactam, 1692 parts of hexamethylene diammonium terephthalate, 11.4 parts of lauryl amine and 1500 parts of water were charged and polymerized for 70 minutes at atmospheric pressure, followed by washing and drying in the foregoing manner. The resulting linear polyamide had an $\eta_{sp}/c$ of 0.684, a softening point of 206° C., a carboxyl group content of 144 eq./$10^6$ gr., and an amino group content of 259 eq./$10^6$ gr.

Eighty-five parts of the modified polyethylene terephthalate prepared in Example 1 was dried in the foregoing manner, and blended with 15 parts of the above-mentioned linear polyamide. The blend in chip form was spun, and the resulting filament was drawn to 4.13 times the original length. The obtained filament had $\Delta n$ of 0.133. The physical properties and other data of the obtained filaments are shown in Tables 7–9.

TABLE 7

| Experiment | Modified polyethylene terephthalate Amount (part) | Softening point (° C.) | $\eta_{sp}/c$ | Linear polyamide Amount (part) | Softening point (° C.) | $\eta_{sp}/c$ | Spinning and drawing properties | Melting point (° C.) | $\eta_{sp}/c$ | $\Delta n$ | Draw ratio |
|---|---|---|---|---|---|---|---|---|---|---|---|
| Example: | | | | | | | | | | | |
| 2 | 85 | 260.0 | 0.926 | 15 | 207 | 0.740 | Satisfactory | 259 | 0.75 | 0.134 | 4.24 |
| 3 | 80 | 259.9 | 0.850 | 20 | 207 | 0.740 | ----do---- | 260 | 0.77 | 0.133 | 4.18 |
| 4 | 75 | 260.1 | 0.988 | 25 | 207 | 0.740 | ----do---- | 260 | 0.82 | 0.132 | 3.80 |
| 5 | 84 | 261.5 | 0.750 | 16 | 196 | 0.685 | ----do---- | 261 | 0.62 | 0.130 | 4.00 |
| 6 | 84 | 261.5 | 0.750 | 16 | 175 | 0.833 | ----do---- | 261 | 0.74 | 0.150 | 4.53 |
| 7 | 75 | 261.5 | 0.750 | 25 | 207 | 0.740 | ----do---- | 260 | 0.66 | 0.134 | 4.32 |
| 8 | 87 | 261.5 | 0.750 | 13 | 207 | 0.740 | ----do---- | 261 | 0.72 | 0.146 | 4.30 |
| 9 | 84 | 259.0 | 1.089 | 16 | 207 | 0.479 | ----do---- | 258 | 0.90 | 0.127 | 4.00 |
| 10 | 84 | 261.0 | 0.635 | 16 | 207 | 0.536 | ----do---- | 261 | 0.57 | 0.138 | 4.30 |
| 11 | 84 | 259.5 | 0.818 | 16 | 207 | 0.687 | ----do---- | 259 | 0.74 | 0.139 | 4.37 |
| 12 | 84 | 259.1 | 1.385 | 16 | 207 | 0.382 | ----do---- | 259 | 0.93 | 0.128 | 4.00 |
| 13 | 84 | 261.5 | 0.750 | 16 | 207 | 0.740 | ----do---- | 261 | 0.70 | 0.116 | 3.15 |
| 14 | 84 | 261.5 | 0.750 | 16 | 207 | 0.740 | ----do---- | 261 | 0.70 | 0.152 | 5.00 |
| 15 | 84 | 260.0 | 0.810 | 16 | 207 | 0.740 | ----do---- | 260 | 0.74 | 0.138 | 4.10 |
| 16 | 84 | 259.2 | 0.933 | 16 | 207 | 0.740 | ----do---- | 259 | 0.76 | 0.137 | 4.10 |
| 17 | 84 | 261.5 | 0.750 | 16 | 207 | 0.740 | ----do---- | 261 | 0.70 | 0.120 | 3.90 |
| 18 | 84 | 259.7 | 0.750 | 16 | 207 | 0.740 | ----do---- | 260 | 0.70 | 0.123 | 3.70 |
| 19 | 84 | 246.3 | 0.742 | 16 | 207 | 0.740 | ----do---- | 244 | 0.70 | 0.135 | 4.25 |
| 20 | 85 | 257.7 | 0.783 | 15 | 207 | 0.740 | ----do---- | 258 | 0.68 | 0.136 | 4.31 |
| 21 | 84 | 260.8 | 0.783 | 16 | 207 | 0.740 | ----do---- | 260 | 0.67 | 0.134 | 4.32 |
| 22 | 84 | 257.8 | 0.786 | 16 | 207 | 0.740 | ----do---- | 258 | 0.68 | 0.141 | 4.30 |
| 23 | (1) | 261.5 | 1.050 | 20 | (2) | 0.621 | ----do---- | 260 | 0.70 | 0.132 | 4.30 |
| 24 | 85 | 260.0 | 0.926 | 15 | 211 | 0.761 | ----do---- | 259 | 0.70 | 0.132 | 4.21 |
| 25 | 85 | 261.5 | 0.750 | 15 | 206 | 0.684 | ----do---- | 260 | 0.69 | 0.133 | 4.13 |
| Control: | | | | | | | | | | | |
| 17 | 84 | 260.5 | 0.989 | 16 | 207 | 0.740 | ----do---- | 260 | 0.79 | 0.132 | 4.21 |
| 18 | 84 | 261.5 | 0.750 | 16 | 207 | 0.740 | ----do---- | 261 | 0.70 | 0.124 | 3.90 |

[1] 80 (PET). [2] Not measured.

TABLE 8

| Experiment | Tenacity (g./de.) | Elongation (percent) | Young's modulus (kg./mm.²) | Elongation elasticity (percent) | Flex abrasion resistance (No. of strokes) | Percent Tenacity retention | Creep | Creep recovery |
|---|---|---|---|---|---|---|---|---|
| Example: | | | | | | | | |
| 2 | 3.4 | 26 | 1,270 | 99 | 590 | 93 | 1.60 | 0.12 |
| 3 | 3.4 | 25 | 1,310 | 99 | 585 | 94 | 1.59 | 0.12 |
| 4 | 3.1 | 23 | 1,280 | 99 | 589 | 88 | 1.43 | 0.12 |
| 5 | 2.7 | 25 | 980 | 98 | 560 | 94 | 1.58 | 0.10 |
| 6 | 2.9 | 25 | 1,190 | 99 | 580 | 92 | 1.53 | 0.11 |
| 7 | 2.3 | 19 | 950 | 96 | 409 | 93 | 1.82 | 0.12 |
| 8 | 3.7 | 23 | 1,210 | 99 | 726 | 90 | 1.59 | 0.18 |
| 9 | 3.4 | 25 | 1,300 | 98 | 598 | 91 | 1.62 | 0.12 |
| 10 | 3.3 | 23 | 1,200 | 99 | 450 | 92 | 1.53 | 0.11 |
| 11 | 3.4 | 24 | 1,210 | 98 | 500 | 91 | 1.69 | 0.12 |
| 12 | 3.0 | 28 | 1,260 | 99 | 510 | 91 | 1.65 | 0.12 |
| 13 | 2.4 | 38 | 890 | 97 | 512 | 88 | 1.90 | 0.19 |
| 14 | 3.9 | 18 | 1,310 | 99 | 851 | 92 | 1.43 | 0.11 |
| 15 | 3.7 | 19 | 1,320 | 98 | 587 | 94 | 1.58 | 0.12 |
| 16 | 3.4 | 24 | 1,250 | 99 | 610 | 95 | 1.45 | 0.12 |
| 17 | 2.5 | 48 | 480 | 85 | 442 | 93 | 1.75 | 0.14 |
| 18 | 2.5 | 37 | 500 | 88 | 296 | 93 | 1.23 | 0.11 |
| 19 | 3.0 | 31 | 1,100 | 96 | 350 | 92 | 1.82 | 0.16 |
| 20 | 3.4 | 27 | 1,310 | 98 | 580 | 89 | 1.60 | 0.12 |
| 21 | 3.4 | 28 | 1,270 | 99 | 513 | 93 | 1.53 | 0.11 |
| 22 | 3.5 | 28 | 1,230 | 99 | 580 | 95 | 1.61 | 0.12 |
| 23 | 3.1 | 25 | 1,150 | 98 | 680 | 93 | 1.62 | 0.13 |
| 24 | 3.0 | 24 | 1,160 | 99 | 510 | 93 | 1.66 | 0.13 |
| 25 | 2.9 | 27 | 1,080 | 99 | 500 | 94 | 1.73 | 0.13 |
| Control: | | | | | | | | |
| 17 | 3.3 | 30 | 1,050 | 99 | 870 | 76 | 1.73 | 0.19 |
| 18 | 2.4 | 36 | 480 | 84 | 482 | 93 | 1.71 | 0.14 |

TABLE 9

| Experiment | Fastness to sunlight | | Fastness to washing | | Dyeability | | | |
|---|---|---|---|---|---|---|---|---|
| | Disperse dyes (grade) | Acid dyes (grade) | Disperse dyes (grade) | Acid dyes (grade) | Disperse dyes (percent) | Acid dyes (K/S) | Acid dyes plus assistant (K/S) | Basic dyes plus assistant |
| Example: | | | | | | | | |
| 2 | 4 | 5 | 5 | 5 | 90.2 | 2.6 | 3.9 | Deep shade. |
| 3 | 4 | 5 | 5 | 5 | 90.0 | 2.5 | 3.7 | Do. |
| 4 | 4 | 4 | 5 | 5 | 89.5 | 2.3 | 3.8 | Do. |
| 5 | 4-5 | 5 | 5 | 5 | 90.1 | 2.5 | 3.5 | Do. |
| 6 | 4 | 5 | 5 | 5 | 89.4 | 2.5 | 2.6 | Do. |
| 7 | 4 | 5 | 5 | 5 | 90.3 | 2.8 | >5.0 | Do. |
| 8 | 4-5 | 5 | 5 | 5 | 89.4 | 2.5 | 3.6 | Do. |
| 9 | 4 | 5 | 5 | 5 | 90.3 | 2.6 | 3.8 | Do. |
| 10 | 4 | 5 | 5 | 5 | 90.6 | 2.7 | 4.7 | Do. |
| 11 | 4-5 | 5 | 5 | 5 | 90.5 | 2.7 | 3.7 | Do. |
| 12 | 4 | 5 | 5 | 5 | 90.1 | 2.6 | 3.5 | Do. |
| 13 | 4 | 4 | 4-5 | 4-5 | 91.4 | 2.6 | 4.9 | Do. |
| 14 | 4 | 5 | 5 | 5 | 88.9 | 2.5 | 3.6 | Do. |
| 15 | 4 | 5 | 5 | 5 | 90.4 | 2.6 | 3.7 | Do. |
| 16 | 4 | 5 | 5 | 5 | 90.2 | 2.6 | 3.6 | Do. |
| 17 | 4 | 5 | 5 | 5 | 89.0 | 2.7 | 3.9 | Do. |
| 18 | 4 | 5 | 5 | 5 | 90.1 | 2.7 | 4.0 | Do. |
| 19 | 4 | 4-5 | 4-5 | 4-5 | 90.3 | 2.6 | 4.0 | Do. |
| 20 | 4 | 5 | 5 | 5 | 90.2 | 2.9 | 4.4 | Do. |
| 21 | 4 | 5 | 5 | 5 | 90.0 | 2.6 | 3.8 | Do. |
| 22 | 4 | 5 | 5 | 5 | 90.3 | 2.6 | 3.9 | Do. |
| 23 | 4 | 5 | 5 | 5 | 90.7 | 2.5 | 3.8 | Do. |
| 24 | 4 | 5 | 5 | 4-5 | 90.0 | 2.5 | 3.6 | Do. |
| 25 | 4 | 5 | 5 | 5 | 91.1 | 2.7 | 3.7 | Do. |
| Control: | | | | | | | | |
| 17 | 3 | [1]4 | 3 | [1]3 | 74.6 | 0.6 | 1.1 | Light shade. |
| 18 | 4 | [1]5 | 5 | [1]5 | 88.0 | 1.2 | 2.4 | Medium shade. |

[1] Determination made with light shade, as the dyeability was inadequate.

We claim:
1. A fibrous material comprising essentially
 (a) 90–70 parts by weight of a modified polyethylene terephthalate which has been copolymerized with 2–7% by weight, based on the overall weight of the modified polyethylene terephthalate, of a polyoxyethylene group of an average molecular weight of 600–6,000, and
 (b) 10–30 parts by weight of a linear polyamide containing 5–60 mol percent of an aromatic radical, based on amide bond;
 (c) wherein the ratio of reduced viscosity of said modified polyethylene terephthalate to the reduced viscosity of said linear polyamide is 0.8–4.0:1, and
 (d) wherein said modified polyethylene terephthalate and said linear polyamide constitute a blend in which each makes up a separate phase; and
 (e) furthermore wherein the birefringence as defined in the specification, $\Delta n$, of said fiber is 0.110–0.160.
2. A fibrous material according to claim 1 wherein said modified polyethylene terephthalate and said linear polyamide are contained in amounts of 88–75 parts by weight and 12–25 parts by weight, respectively.

3. A fibrous material according to claim 1 wherein the birefringence, $\Delta n$, of said fiber is 0.120–0.150.
4. A fibrous material according to claim 1, wherein said modified polyethylene terephthalate is a polyester the principal constituent of which is ethylene terephthalate to which has been copolymerized 3–6% by weight of a polyoxyethylene group having an average molecular weight of 1000–5000.
5. A fibrous material according to claim 1 wherein said fibrous material is a member selected from the group consisting of monofilament, multifilaments and staple fiber.

References Cited

FOREIGN PATENTS

| 6608121 | 12/1966 | Netherlands | 260—857 |
| 6708693 | 1/1968 | Netherlands | 260—857 |

PAUL LIEBERMAN, Primary Examiner

U.S. Cl. X.R.

260—40, 45.7, 45.85, 45.9, 45.95, 47, 75, 78, 78.3